US008446401B2

(12) United States Patent
Tanikame et al.

(10) Patent No.: US 8,446,401 B2
(45) **Date of Patent: *May 21, 2013**

(54) DISPLAY APPARATUS AND DISPLAY-APPARATUS DRIVING METHOD

(75) Inventors: Takao Tanikame, Kanagawa (JP); Seiichiro Jinta, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,641

(22) Filed: Jul. 17, 2012

(65) Prior Publication Data

US 2012/0280964 A1 Nov. 8, 2012

Related U.S. Application Data

(63) Continuation of application No. 12/385,690, filed on Apr. 16, 2009.

(30) Foreign Application Priority Data

May 1, 2008 (JP) ................................ 2008-119840

(51) Int. Cl.
*G06F 3/038* (2006.01)

(52) U.S. Cl.
USPC ........................................ 345/211; 345/76

(58) Field of Classification Search
None
See application file for complete search history.

(56) References Cited

U.S. PATENT DOCUMENTS

| | | | | |
|---|---|---|---|---|
| 7,053,875 | B2 * | 5/2006 | Chou | 345/92 |
| 7,319,447 | B2 * | 1/2008 | Hsueh | 345/82 |
| 7,414,599 | B2 | 8/2008 | Chung et al. | |

FOREIGN PATENT DOCUMENTS

| | | | |
|---|---|---|---|
| JP | 2005-031630 | | 2/2005 |
| JP | 2006-039544 | A | 9/2006 |
| JP | 2007-264587 | A | 10/2007 |
| JP | 2008-158475 | A | 7/2008 |
| JP | 2008-262143 | A | 10/2008 |
| JP | 2009-237558 | A | 10/2009 |
| JP | 2009-251590 | A | 10/2009 |

OTHER PUBLICATIONS

Japanese Office Action issued Jun. 26, 2012 for corresponding Japanese Application No. 2008-119840.

* cited by examiner

*Primary Examiner* — Jason Olson
(74) *Attorney, Agent, or Firm* — Rader, Fishman & Grauer PLLC

(57) ABSTRACT

Disclosed herein is a driving method and display apparatus, the display apparatus including light emitting units, scan lines, data lines, a driving circuit provided for each of the light emitting units to serve as a circuit having a signal writing transistor, a device driving transistor, a capacitor and a first switch circuit, and a light emitting device.

8 Claims, 13 Drawing Sheets

[TP(1)-1]

[TP(1)0]

[TP(1)₁]

[TP(1)₂]

[TP(2)2]

[TP(2)3]

DISPLAY APPARATUS AND DISPLAY-APPARATUS DRIVING METHOD

CROSS REFERENCE TO RELATED APPLICATIONS

This is a Continuation Application of U.S. patent application Ser. No. 12/385,690, filed Apr. 16, 2009, which in turn claims priority from Japanese Application No.: 2008-119840, filed on May 1, 2008, the entire contents of which are incorporated herein by reference.

BACKGROUND OF THE INVENTION

1. Field of the Invention

In general, the present invention relates to a display apparatus and a driving method for driving the display apparatus. More particularly, the present invention relates to a display apparatus employing light emitting units, which each have a light emitting device and a driving circuit for driving the light emitting device, and relates to a driving method for driving the display apparatus.

2. Description of the Related Art

As already known in general, there is a light emitting unit having a light emitting device and a driving circuit for driving the light emitting device. A typical example of the light emitting device is an organic EL (Electro Luminescence) light emitting device. In addition, a display apparatus employing the light emitting units is also already commonly known. The luminance of light emitted by the light emitting unit is determined by the magnitude of the driving current. A typical example of such a display apparatus is an organic EL display apparatus which employs organic EL light emitting devices. In addition, in the same way as a liquid-crystal display apparatus, the display apparatus employing the light emitting units adopts one of commonly known driving methods such as a simple matrix method and an active matrix method. In comparison with the simple matrix method, the active matrix method has a demerit that the active matrix method entails a complicated configuration of the driving circuit. However, the active matrix method offers a variety of merits such as a capability of increasing the luminance of light emitted by the light emitting device.

As already known, there are a variety of active-matrix driving circuits which each employ transistors and a capacitor. Such a driving circuit serves as a circuit for driving the light emitting device included in the same light emitting unit as the driving circuit. For example, Japanese Patent Laid-open No. 2005-31630 discloses an organic EL display apparatus employing light emitting units, which each have an organic EL light emitting device and a driving circuit for driving the organic EL light emitting device, and discloses a driving method for driving the organic EL display apparatus. The driving circuit employs six transistors and one capacitor. In the following description, the driving circuit employing six transistors and one capacitor is referred to as a 6Tr/1C driving circuit. FIG. 10 is a diagram showing an equivalent circuit of the 6Tr/1C driving circuit included in a light emitting unit located at the intersection of an mth matrix row and an nth matrix column in a two-dimensional matrix in which N×M light emitting units employed in a display apparatus are laid out. It is to be noted that the light emitting units are sequentially scanned by a scan circuit 101 in row units on a row-after-row basis.

The 6Tr/1C driving circuit employs a signal writing transistor $TR_W$, a device driving transistor $TR_D$ and a capacitor $C_1$ in addition to a first transistor $TR_1$, a second transistor $TR_2$, a third transistor $TR_3$ and a fourth transistor $TR_4$.

A specific one of the source and drain areas of the signal writing transistor $TR_W$ is connected to a data line $DTL_n$ whereas the gate electrode of the signal writing transistor $TR_W$ is connected to a scan line $SCL_m$. A specific one of the source and drain areas of the device driving transistor $TR_D$ is connected to the other one of the source and drain areas of the signal writing transistor $TR_W$ through a first node $ND_1$. A specific one of the terminals of the capacitor $C_1$ is connected to a first power-supply line PS1 to which a reference voltage is applied. In the typical light emitting unit shown in the diagram of FIG. 10, the reference voltage is a reference voltage $V_{CC}$ to be described later. The other one of the terminals of the capacitor $C_1$ is connected to the gate electrode of the device driving transistor $TR_D$ through a second node $ND_2$. The scan line $SCL_m$ is connected to the scan circuit 101 whereas the data line $DTL_n$ is connected to a signal outputting circuit 102.

A specific one of the source and drain areas of the first transistor $TR_1$ is connected to the second node $ND_2$ whereas the other one of the source and drain areas of the first transistor $TR_1$ is connected to the other one of the source and drain areas of the device driving transistor $TR_D$. The first transistor $TR_1$ serves as a first switch circuit connected between the second node $ND_2$ and the other one of the source and drain areas of the device driving transistor $TR_D$.

A specific one of the source and drain areas of the second transistor $TR_2$ is connected to a third power-supply line PS3 to which a predetermined initialization voltage $V_{Ini}$ for initializing an electric potential appearing on the second node $ND_2$ is applied. The initialization voltage $V_{Ini}$ is typically −4 volts. The other one of the source and drain areas of the second transistor $TR_2$ is connected to the second node $ND_2$. The second transistor $TR_2$ serves as a second switch circuit connected between the second node $ND_2$ and the third power-supply line PS3 to which the predetermined initialization voltage $V_{Ini}$ is applied.

A specific one of the source and drain areas of the third transistor $TR_3$ is connected to the first power-supply line PS1 to which the predetermined reference voltage $V_{CC}$ of typically 10 volts is applied. The other one of the source and drain areas of the third transistor $TR_3$ is connected to the first node $ND_1$. The third transistor $TR_3$ serves as a third switch circuit connected between the first node $ND_1$ and the first power-supply line PS1 to which the predetermined reference voltage $V_{CC}$ is applied.

A specific one of the source and drain areas of the fourth transistor $TR_4$ is connected to the other one of the source and drain areas of the device driving transistor $TR_D$ whereas the other one of the source and drain areas of the fourth transistor $TR_4$ is connected to a specific one of the terminals of a light emitting device ELP. The specific one of the terminals of the light emitting device ELP is the anode electrode of the light emitting device ELP. The fourth transistor $TR_4$ serves as a fourth switch circuit connected between the other one of the source and drain areas of the device driving transistor $TR_D$ and the specific terminal of the light emitting device ELP.

The gate electrodes of the signal writing transistor $TR_W$ and the first transistor $TR_1$ are connected to the scan line $SCL_m$ whereas the gate electrode of the second transistor $TR_2$ is connected to a scan line $SCL_{m-1}$ provided for a matrix row right above a matrix row associated with the scan line $SCL_m$. The gate electrodes of the third transistor $TR_3$ and the fourth transistor $TR_4$ are connected to a third/fourth-transistor control line $CL_m$.

Each of the transistors is a TFT (Thin Film Transistor) of a p-channel type. The light emitting device ELP is provided typically on an inter-layer insulation layer which is created to cover the driving circuit. The anode electrode of the light emitting device ELP is connected to the other one of the source and drain areas of the fourth transistor $TR_4$ whereas the cathode electrode of the light emitting device ELP is connected to a second power-supply line PS2 for supplying a cathode voltage $V_{Cat}$ of typically −10 volts to the cathode electrode. Reference notation $C_{EL}$ denotes the parasitic capacitance of the light emitting device ELP.

It is impossible to prevent the threshold voltage of a TFT from varying to a certain degree from transistor to transistor. Variations of the threshold voltage of the device driving transistor $TR_D$ cause variations of the magnitude of a driving current flowing through the light emitting device ELP. If the magnitude of the driving current flowing through the light emitting device ELP varies from a light emitting unit to another, the uniformity of the luminance of the display apparatus deteriorates. It is thus necessary to prevent the magnitude of the driving current flowing through the light emitting device ELP from being affected by variations of the threshold voltage of the device driving transistor $TR_D$. As will be described later, the light emitting device ELP is driven in such a way that the luminance of light emitted by the light emitting device ELP is not affected by variations of the threshold voltage of the device driving transistor $TR_D$.

By referring to diagrams of FIGS. 11A and 11B, the following description explains a driving method for driving an light emitting device ELP employed in a light emitting unit located at the intersection of an mth matrix row and an nth matrix column of a two-dimensional matrix in which N×M light emitting units employed in a display apparatus are laid out. FIG. 11A is a model timing diagram showing timing charts of signals appearing on the scan line $SCL_{m-1}$, the scan line $SCL_m$ and the third/fourth-transistor control line $CL_m$. On the other hand, FIG. 11B and FIGS. 11C and 11D are model circuit diagrams showing the turned-on and turned-off states of the transistors employed in the driving circuit. For the sake of convenience, in the following description, the scan period in which the scan line $SCL_{m-1}$ is scanned is referred to as the (m−1)th horizontal scan period whereas the scan period in which the scan line $SCL_m$ is scanned is referred to as the mth horizontal scan period.

As shown in the timing diagram of FIG. 11A, during the (m−1)th horizontal scan period, a second-node electric-potential initialization process is carried out. The second-node electric-potential initialization process is explained in detail by referring to the circuit diagram of FIG. 11B as follows. At the beginning of the (m−1)th horizontal scan period, an electric potential appearing on the scan line $SCL_{m-1}$ is changed from a high level to a low level but an electric potential appearing on the third/fourth-transistor control line $CL_m$ is conversely changed from a low level to a high level. It is to be noted that, at that time, an electric potential appearing on the scan line $SCL_m$ is sustained at a high level. Thus, during the (m−1)th horizontal scan period, each of the signal writing transistor $TR_W$, the first transistor $TR_1$, the third transistor $TR_3$ and the fourth transistor $TR_4$ is put in a turned-off state whereas the second transistor $TR_2$ is put in a turned-on state.

In these states, the initialization voltage $V_{Ini}$ for initializing the second node $ND_2$ is applied to the second node $ND_2$ by way of the second transistor $TR_2$ which has been set in a turned-on state. Thus, during this period, the second-node electric-potential initialization process is carried out.

Then, as shown in the timing diagram of FIG. 11A, during the mth horizontal scan period, the electric potential appearing on the scan line $SCL_m$ is changed from a high level to a low level in order to put the signal writing transistor $TR_W$ in a turned-on state so that the video signal $V_{Sig}$ appearing on the data line $DTL_n$ is written into the first node $ND_1$ by way of the signal writing transistor $TR_W$. During this mth horizontal scan period, a threshold-voltage cancelling process is also carried out. To put it concretely, the second node $ND_2$ is electrically connected to the other one of the source and drain areas of the device driving transistor $TR_D$. When the electric potential appearing on the scan line $SCL_m$ is changed from a high level to a low level in order to put the signal writing transistor $TR_W$ in a turned-on state, the video signal $V_{Sig}$ appearing on the data line $DTL_n$ is written into the first node $ND_1$ by way of the signal writing transistor $TR_W$. As a result, the electric potential appearing on the second node $ND_2$ rises to a level obtained by subtracting the threshold voltage $V_{th}$ of the device driving transistor $TR_D$ from the video signal $V_{Sig}$.

The processes described above are explained in detail by referring to the diagrams of FIGS. 11A and 11C as follows. At the beginning of the mth horizontal scan period, the electric potential appearing on the scan line $SCL_{m-1}$ is changed from a low level to a high level but the electric potential appearing on the scan line $SCL_m$ is conversely changed from a high level to a low level. It is to be noted that, at that time, the electric potential appearing on the third/fourth-transistor control line $CL_m$ is sustained at the high level. Thus, during the mth horizontal scan period, each of the signal writing transistor $TR_W$ and the first transistor $TR_1$ is put in a turned-on state whereas each of the second transistor $TR_2$, the third transistor $TR_3$ and the fourth transistor $TR_4$ is conversely put in a turned-off state.

The second node $ND_2$ is electrically connected to the other one of the source and drain areas of the device driving transistor $TR_D$ through the first transistor $TR_1$ which has been put in a turned-on state. When the electric potential appearing on the scan line $SCL_m$ is changed from a high level to a low level in order to put the signal writing transistor $TR_W$ in a turned-on state, the video signal $V_{Sig}$ appearing on the data line $DTL_n$ is written into the first node $ND_1$ by way of the signal writing transistor $TR_W$. As a result, the electric potential appearing on the second node $ND_2$ rises to a level obtained by subtracting the threshold voltage $V_{th}$ of the device driving transistor $TR_D$ from the video signal $V_{Sig}$.

That is to say, if the electric potential appearing on the second node $ND_2$ connected to the gate electrode of the device driving transistor $TR_D$ has been initialized at a level putting the device driving transistor $TR_D$ in a turned-on state at the beginning of the mth horizontal scan period by carrying out the second-node electric-potential initialization process during the (m−1)th horizontal scan period, the electric potential appearing on the second node $ND_2$ rises toward the video signal $V_{Sig}$ applied to the first node $ND_1$. As the difference in electric potential between the gate electrode and the specific one of the source and drain areas of the device driving transistor $TR_D$ attains the threshold voltage $V_{th}$ of the device driving transistor $TR_D$, however, the device driving transistor $TR_D$ is put in a turned-off state in which the electric potential appearing on the second node $ND_2$ is about equal to an electric-potential difference of $(V_{Sig}-V_{th})$.

Later on, a driving current flows from the first power-supply line PS1 to the light emitting device ELP by way of the device driving transistor $TR_D$, driving the light emitting device ELP to emit light.

The process is explained in detail by referring to the diagrams of FIGS. 11A and 11D as follows. At the beginning of a (m+1)th horizontal scan period not shown, the electric potential appearing on the scan line $SCL_m$ is changed from a low level to a high level. Afterwards, the electric potential appearing on the third/fourth-transistor control line $CL_m$ is changed conversely from a high level to a low level. It is to be noted that, at that time, the electric potential appearing on the scan line $SCL_{m-1}$ is sustained at a high level. As a result, each of the third transistor $TR_3$ and the fourth transistor $TR_4$ is put in a turned-on state whereas each of the signal writing transistor $TR_W$, the first transistor $TR_1$ and the second transistor $TR_2$ is conversely put in a turned-off state.

During the (m+1)th horizontal scan period, a driving voltage $V_{CC}$ is applied to the specific one of the source and drain areas of the device driving transistor $TR_D$ through the third transistor $TR_3$ which has been put in the turned-on state. The other one of the source and drain areas of the device driving transistor $TR_D$ is connected to the specific electrode of the light emitting device ELP by the fourth transistor $TR_4$ which has been put in the turned-on state.

Since the driving current flowing through the light emitting device ELP is a source-to-drain current $I_{ds}$ flowing from the source area of the device driving transistor $TR_D$ to the drain area of the same transistor, if the device driving transistor $TR_D$ is ideally operating in a saturated region, the driving current can be expressed by Eq. (A) given below. As shown in the circuit diagram of FIG. 11D, the source-to-drain current $I_{ds}$ is flowing to the light emitting device ELP, and the light emitting device ELP is emitting light at a luminance determined by the magnitude of the source-to-drain current $I_{ds}$.

$$I_{ds}=k*\mu*(V_{gs}-V_{th})^2 \quad \text{(A)}$$

In the above equation, reference notation μ denotes the effective mobility of the device driving transistor $TR_D$ whereas reference notation L denotes the length of the channel of the device driving transistor $TR_D$. Reference notation W denotes the width of the channel of the device driving transistor $TR_D$. Reference notation $V_{gs}$ denotes a voltage applied between the source area of the device driving transistor $TR_D$ and the gate electrode of the same transistor. Reference notation $C_{0X}$ denotes a quantity expressed by the following expression:

(Specific dielectric constant of the gate insulation layer of the device driving transistor $TR_D$)×(Vacuum dielectric constant)/(Thickness of the gate insulation layer of the device driving transistor $TR_D$)

Reference notation k denotes an expression as follows:

$$k\equiv(1/2)*(W/L)*C_{0X}$$

The voltage $V_{gs}$ applied between the source area of the device driving transistor $TR_D$ and the gate electrode of the same transistor is expressed as follows:

$$V_{gs}\approx V_{CC}-(V_{Sig}-V_{th}) \quad \text{(B)}$$

By substituting the expression on the right-hand side of Eq. (B) into the expression on the right-hand side of Eq. (A) to serve as a replacement of the term $V_{gs}$ included in the expression on the right-hand side of Eq. (A), Eq. (C) can be derived from Eq. (A) as follows:

$$\begin{aligned} I_{ds} &= k*\mu*(V_{CC}-(V_{Sig}-V_{th})-V_{th})^2 \quad \text{(C)} \\ &= k*\mu*(V_{CC}-V_{Sig})^2 \end{aligned}$$

As is obvious from Eq. (C), the source-to-drain current $I_{ds}$ is not dependent on the threshold voltage $V_{th}$ of the device driving transistor $TR_D$. In other words, it is possible to generate the source-to-drain current $I_{ds}$ in accordance with the video signal $V_{Sig}$ as a current flowing to the light emitting device ELP with a magnitude not affected by the threshold voltage $V_{th}$ of the device driving transistor $TR_D$. In accordance with the driving method described above, variations of the threshold voltage $V_{th}$ of the device driving transistor $TR_D$ from transistor to transistor by no means have an effect on the luminance of light emitted by the light emitting device ELP.

SUMMARY OF THE INVENTION

In order to operate the driving circuit described above, the display apparatus additionally requires a separate power-supply line for supplying the driving voltage $V_{CC}$, a separate power-supply line for supplying the cathode voltage $V_{Cat}$ and a separate power-supply line for supplying the initialization voltage $V_{Ini}$. If the layouts of wires and the driving circuit are to be taken into consideration, however, it is desirable to provide only few power-supply lines.

In order to solve the problems described above, inventors of the present invention have innovated a display apparatus allowing the number of power-supply lines to be reduced and innovated a driving method for driving the display apparatus.

In order to solve the problems described above, there is provided a display apparatus according an embodiment of to the present invention or a display apparatus to which a driving method according to the embodiment of the present invention is applied. The display apparatus employs:

(1): N×M light emitting units laid out to form a two-dimensional matrix composed of N matrix columns oriented in a first direction and M matrix rows oriented in a second direction;

(2): M scan lines each stretched in the first direction; and (3): N data lines each stretched in the second direction.

Each of the light emitting units includes:

(4): a driving circuit, which has a signal writing transistor, a device driving transistor, a capacitor and a first switch circuit; and (5): a light emitting device for emitting light at a luminance according to a driving current output by the device driving transistor.

In each of the light emitting units, (A-1): a specific one of the source and drain areas of the signal writing transistor is connected to one of the data lines;

(A-2): the gate electrode of the signal writing transistor is connected to one of the scan lines;

(B-1): a specific one of the source and drain areas of the device driving transistor is connected to the other one of the source and drain areas of the signal writing transistor through a first node;

(C-1): a specific one of the terminals of the capacitor is connected to a second power-supply line conveying a reference voltage determined in advance;

(C-2): the other one of the terminals of the capacitor is connected to the gate electrode of the device driving transistor through a second node;

(D-1): a specific one of the terminals of the first switch circuit is connected to the second node;

(D-2): the other one of the terminals of the first switch circuit is connected to the other one of the source and drain areas of the device driving transistor; and (E): the driving circuit further has a second switch circuit connected between the second node and a first power-supply line.

The driving method provided for the display apparatus according to the embodiment of the present invention to serve as a driving method for solving the problems described above has:

a second-node electric-potential initialization process of applying a predetermined initialization voltage appearing on the first power-supply line to the second node by way of the second switch circuit put in a turned-on state and, then, putting the second switch circuit in a turned-off state in order to set an electric potential appearing on the second node at a reference electric potential determined in advance; and a light emission process of sustaining the second switch circuit in a turned-off state and applying a predetermined driving voltage appearing on the first power-supply line to the first node in order to allow a driving current to flow from the device driving transistor to the light emitting device so as to drive the light emitting device to emit light.

In the display apparatus provided by the embodiment of the present invention to serve as a display apparatus for solving the problems described above:

a second-node electric-potential initialization process is carried out by applying a predetermined initialization voltage appearing on the first power-supply line to the second node by way of the second switch circuit put in a turned-on state and, then, putting the second switch circuit in a turned-off state in order to set an electric potential appearing on the second node at a reference electric potential determined in advance; and a light emission process is carried out by sustaining the second switch circuit in a turned-off state and applying a predetermined driving voltage appearing on the first power-supply line to the first node in order to allow a driving current to flow from the device driving transistor to the light emitting device so as to drive the light emitting device to emit light.

In the display apparatus provided by the embodiment of the present invention, the driving circuit further has a second switch circuit connected between the second node and the power-supply line. The driving method provided by the embodiment of the present invention has the second-node electric-potential initialization process of applying a predetermined initialization voltage appearing on the power-supply line to the second node by way of the second switch circuit put in a turned-on state. In addition, the driving method has the light emission process of sustaining the second switch circuit in a turned-off state and applying a predetermined driving voltage appearing on the first power-supply line to the first node. Thus, it is not necessary to separately provide a power-supply line for supplying the initialization voltage determined in advance. In addition, the display apparatus can be driven without raising any problems even if the power-supply line for supplying the initialization voltage determined in advance is eliminated.

The driving method provided for the display apparatus according to the embodiment of the present invention has a signal writing process of changing an electric potential appearing on the second node toward an electric potential, which is obtained as a result of subtracting the threshold voltage of the device driving transistor from the voltage of a video signal appearing on one of the data lines, by applying the video signal to the first node by way of the signal writing transistor which is put in a turned-on state by a signal appearing on one of the scan lines when the first switch circuit is put in a turned-on state in order to put the second node in a state of being electrically connected to the other one of the source and drain areas of the device driving transistor. It is possible to provide a desirable configuration in which the second-node electric-potential initialization process, the signal writing process and the light emission process are carried out sequentially on a one-process-after-another basis. In this case, it is possible to provide a desirable configuration in which a second-node electric-potential correction process is carried out between the signal writing process and the light emission process so as to change an electric potential appearing on the second node by applying a voltage having a magnitude determined in advance to the first node for a time period determined in advance with the first switch circuit already put in a turned-on state in order to put the second node in a state of being electrically connected to the other one of the source and drain areas of the device driving transistor. In this case, it is possible to provide a desirable configuration in which the driving voltage asserted on the power-supply line is applied to the first node as the voltage having a magnitude determined in advance in the second-node electric-potential correction process.

The display apparatus according to the embodiment of the present invention and the display apparatus to which a driving method according to the embodiment of the present invention is applied are collectively referred to simply as a display apparatus provided by the embodiment of the present invention in some cases. It is possible to provide the display apparatus with a configuration in which the second switch circuit employed in the driving circuit of the light emitting unit provided for the mth matrix row associated with the scan line $SCL_m$ is controlled by a scan signal asserted on the scan line $SCL_{m\_pre\_P}$ provided for a matrix row preceding the mth matrix row by P matrix rows where: suffix or notation m denotes an integer having a value of 1, 2, . . . or M; and notation P is an integer determined in advance for the display apparatus as an integer satisfying relations of $1 \leqq P < M$. This configuration offers a merit that it is not necessary to provide a new control circuit for controlling the second switch circuit. If the length of a wire connecting the scan line $SCL_{m\_pre\_P}$ to the second switch circuit is taken into consideration, it is desirable to provide a configuration in which the integer P is set at 1 (that is, P=1). However, implementations of the embodiment of the present invention are by no means limited to the configuration.

It is possible to provide the display apparatus provided by the embodiment of the present invention with a configuration in which the driving circuit further employs:

(F): a third switch circuit connected between the first node and the first power-supply line; and (G): a fourth switch circuit connected between the other one of the source and drain areas of the device driving transistor and the specific one of the electrodes of the light emitting device.

In addition, it is possible to provide the driving method for driving the display apparatus provided by the embodiment of the present invention with a configuration including the steps of:

(a): carrying out a second-node electric-potential initialization process of applying a predetermined initialization voltage appearing on the first power-supply line to the second node by way of the second switch circuit put in a turned-on state and, then, putting the second switch circuit in a turned-off state in order to set an electric potential appearing on the second node at a reference electric potential determined in advance;

(b): carrying out a signal writing process of sustaining each of the second, third and fourth switch circuits in a turned-off state and putting the first switch circuit in a turned-on state to put the second node in a state of being electrically connected to the other one of the source and drain areas of the device driving transistor so as to apply a video signal appearing on one of the data lines to the first node by way of the signal writing transistor put in a turned-on state by a signal appearing on one of the scan lines in order to change an electric potential appearing on the second node toward an electric potential obtained as a result of subtracting the threshold voltage of the device driving transistor from the video signal;

(c): applying a signal asserted on one of the scan lines to the gate electrode of the signal writing transistor later on in order to put the signal writing transistor in a turned-off state; and (d): carrying out a light emission process of putting the first switch circuit in a turned-off state, sustaining the second switch circuit in a turned-off state, putting the other one of the source and drain areas of the device driving transistor in a state of being electrically connected to the specific one of the electrodes of the light emitting device by way of the fourth transistor put in a turned-on state and applying a driving voltage determined in advance from the first power-supply line to the first node by way of the third switch circuit which has already been put in a turned-on state so as to allow a driving current to flow from the device driving transistor to the light emitting device in order to drive the light emitting device. In addition, it is possible to provide a configuration in which, between the steps (c) and (d), a second-node electric-potential correction process is carried out in order to change an electric potential appearing on the second node by applying the driving voltage as a voltage with a magnitude determined in advance to the first node for a period determined in advance with the first switch circuit sustained in a turned-on state, the second switch circuit sustained in a turned-off state, the third switch circuit put in a turned-on state and the second node put in a state of being electrically connected to the other one of the source and drain areas of the device driving transistor by the first switch circuit already put in a turned-on state.

In the display apparatus provided by the embodiment of the present invention, it is possible to make use of a light emitting device emitting light by a driving current flowing through the light emitting device to serve as the light emitting device employed in every light emitting unit included in the display apparatus. Typical examples of the light emitting device are an organic EL (Electro Luminescence) light emitting device, an inorganic EL light emitting device, an LED (light emitting diode) light emitting device and a semiconductor laser light emitting device. If construction of a color planar display apparatus is to be taken into consideration, it is desirable to make use of the organic EL light emitting device to serve as the light emitting device employed in every light emitting unit included in the display apparatus.

In the display apparatus provided by the embodiment of the present invention, a reference voltage determined in advance is supplied to a specific one of the terminals of the capacitor. Thus, an electric potential appearing on the specific one of the terminals of the capacitor is sustained during an operation carried out by the display apparatus. The magnitude of the reference voltage determined in advance is not prescribed in particular. For example, it is also possible to provide a desirable configuration in which the specific one of the terminals of the capacitor is connected to a power line conveying a predetermined voltage to be applied to the other one of the electrodes of the light emitting device and the predetermined voltage is applied to the specific one of the terminals of the capacitor as the reference voltage determined in advance.

In the display apparatus provided by the embodiment of the present invention as a display apparatus with the desirable configurations described above, a commonly known configuration and a commonly known structure can be used respectively as the configuration and structure of each of a variety of lines such as the scan lines, the data lines and the power-supply lines. In addition, a commonly known configuration and a commonly known structure can be used respectively as the configuration and structure of the light emitting device. To put it more concretely, if an organic EL light emitting device is used to serve as the light emitting device employed in every light emitting unit, typically, the organic EL light emitting device can be configured to include components such as an anode electrode, a hole transport layer, a light emitting layer, an electron transport layer and a cathode electrode. On top of that, a commonly known configuration and a commonly known structure can be used respectively as the configuration and structure of each of a variety of circuits such as a scan circuit connected to the scan lines and a signal outputting circuit connected to the data lines.

The display apparatus provided by the embodiment of the present invention can have the configuration of the so-called monochrome display apparatus. As an alternative, the display apparatus provided by the embodiment of the present invention can have a configuration in which a pixel includes a plurality of sub-pixels. To put it more concretely, the display apparatus provided by the embodiment of the present invention can have a configuration in which a pixel includes three sub-pixels, i.e., a red-light emitting sub-pixel, a green-light emitting sub-pixel and a blue-light emitting sub-pixel. In addition, each of the three sub-pixels having types different from each other can be a set including an additional sub-pixel of a type determined in advance or a plurality of additional sub-pixels having types different from each other. For example, the set includes an additional sub-pixel for emitting light having the white color for increasing the luminance. As another example, the set includes an additional sub-pixel for emitting light having a complementary color for enlarging a color reproduction range. As a further example, the set includes an additional sub-pixel for emitting light having the yellow color for enlarging a color reproduction range. As a still further example, the set includes an additional sub-pixel for emitting light having the yellow and cyan colors for enlarging a color reproduction range.

Each of the signal writing transistor and the device driving transistor can be configured by making use of a TFT (Thin Film Transistor) of a p-channel type. It is to be noted that the signal writing transistor can be configured by making use of a TFT of an n-channel type. Each of the first, second, third and fourth switch circuits can be configured by making use of a commonly known switching device such as a TFT. For example, each of the first, second, third and fourth switch circuits can be configured by making use of a TFT of the p-channel type or a TFT of the n-channel type.

The capacitor employed in the driving circuit can be typically configured to include a specific electrode, another electrode and a dielectric layer sandwiched by the electrodes. The dielectric layer is an insulation layer. Each of the transistors and the capacitor, which compose the driving circuit, is created within a certain plane. For example, each of the transistors and the capacitor is created on a support body. If the light emitting device is an organic EL light emitting device for example, the light emitting device is created above the transistors and the capacitor composing the device driving transistor through the insulation layer. The other one of the source and drain areas of the device driving transistor is connected to a specific one of the electrodes of the light emitting device by way of another transistor. In the typical configuration shown in the diagram of FIG. 1, the specific electrode of the light emitting device is the anode electrode. Please be advised that it is possible to provide a configuration in which each of the transistors is created on a semiconductor substrate or the like.

The technical phrase 'the specific one of the two source and drain areas of a transistor' may be used to imply the source or drain area connected to a power supply in some cases. The turned-on state of a transistor is a state in which a channel has been created between the source and drain areas of the transistor. There is not raised a question as to whether a current is flowing from the specific one of the source and drain areas of the transistor to the other one of the source and drain areas of the transistor or vice versa in the turning-on state of the transistor. On the other hand, the turned-off state of a transistor is a state in which no channel has been created between the source and drain areas of the transistor. A particular one of the source and drain areas of a transistor is connected to a particular one of the source and drain areas of another transistor by creating the particular source and drain areas of the two transistors as areas occupying the same region. In addition, it is possible to create a source or drain area of a transistor from not only a conductive material, but also a layer made of substances of different kinds. Typical examples of the conductive material are poly-silicon and amorphous silicon which include impurities. The substances for making the layer include a metal, an alloy, conductive particles, a laminated structure of a metal, an alloy and conductive particles as well as an organic material (or a conductive polymer). In every timing chart referred to in the following description, the length of a time period along the horizontal axis representing the lapse of time is no more than a model quantity and does not necessarily represent a magnitude relative to a reference on the horizontal axis.

In the display apparatus provided by the embodiment of the present invention, the driving circuit further has a second switch circuit connected between the second node and the power-supply line. The driving method provided by the embodiment of the present invention to serve as a driving method for driving the display apparatus has the second-node electric-potential initialization process of applying a predetermined initialization voltage appearing on the power-supply line to the second node by way of the second switch circuit put in a turned-on state. In addition, the driving method has the light emission process of sustaining the second switch circuit in a turned-off state and applying a predetermined driving voltage appearing on the power-supply line to the first node. Thus, it is not necessary to separately provide a power-supply line for supplying the initialization voltage determined in advance. In addition, the display apparatus can be driven without raising any problems even if the power-supply line for supplying the initialization voltage determined in advance is eliminated.

BRIEF DESCRIPTION OF THE DRAWINGS

The innovations and features of the present invention will become clear from the following description of the preferred embodiments given with reference to the accompanying diagrams, in which.

DETAILED DESCRIPTION OF THE PREFERRED EMBODIMENTS

Preferred embodiments of the invention are explained by referring to diagrams as follows.

First Embodiment

A first embodiment implements a display apparatus provided by the present invention and a driving method provided by the present invention to serve as a method for driving the display apparatus. The display apparatus according to the first embodiment of the present invention is an organic EL (Electro Luminescence) display apparatus employing a plurality of light emitting units 10, which each have an organic EL light emitting device ELP and a driving circuit 11 for driving the organic EL light emitting device. In the following description, the light emitting unit is also referred to as a pixel circuit in some cases. First of all, an outline of the display apparatus is explained.

Figure 1:
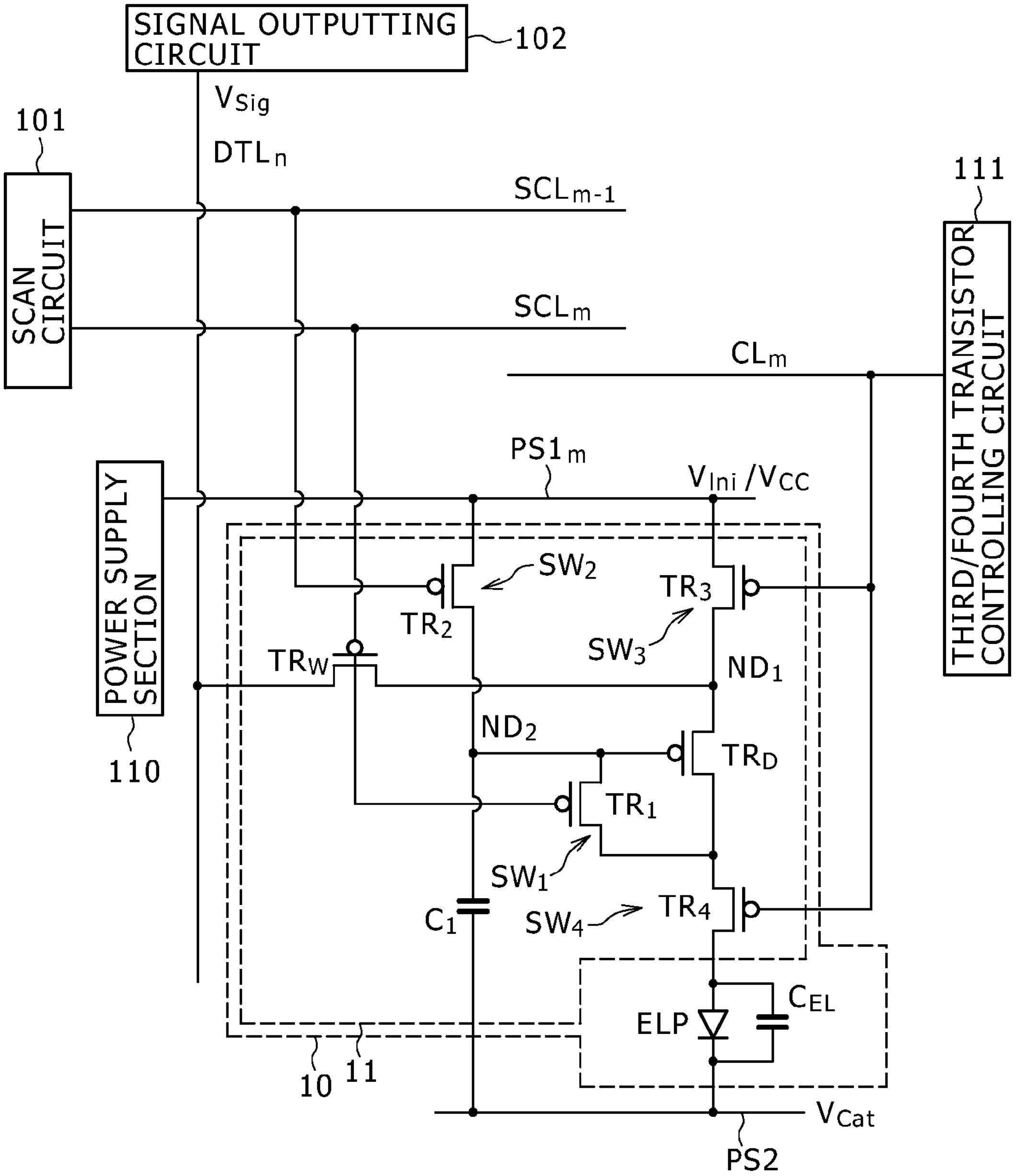
FIG. 1 is a diagram showing an equivalent circuit of a driving circuit employed in a light emitting unit located at the intersection of an mth matrix row and an nth matrix column in a two-dimensional matrix of N×M light emitting units employed in a display apparatus according to a first embodiment.
Figure 2:
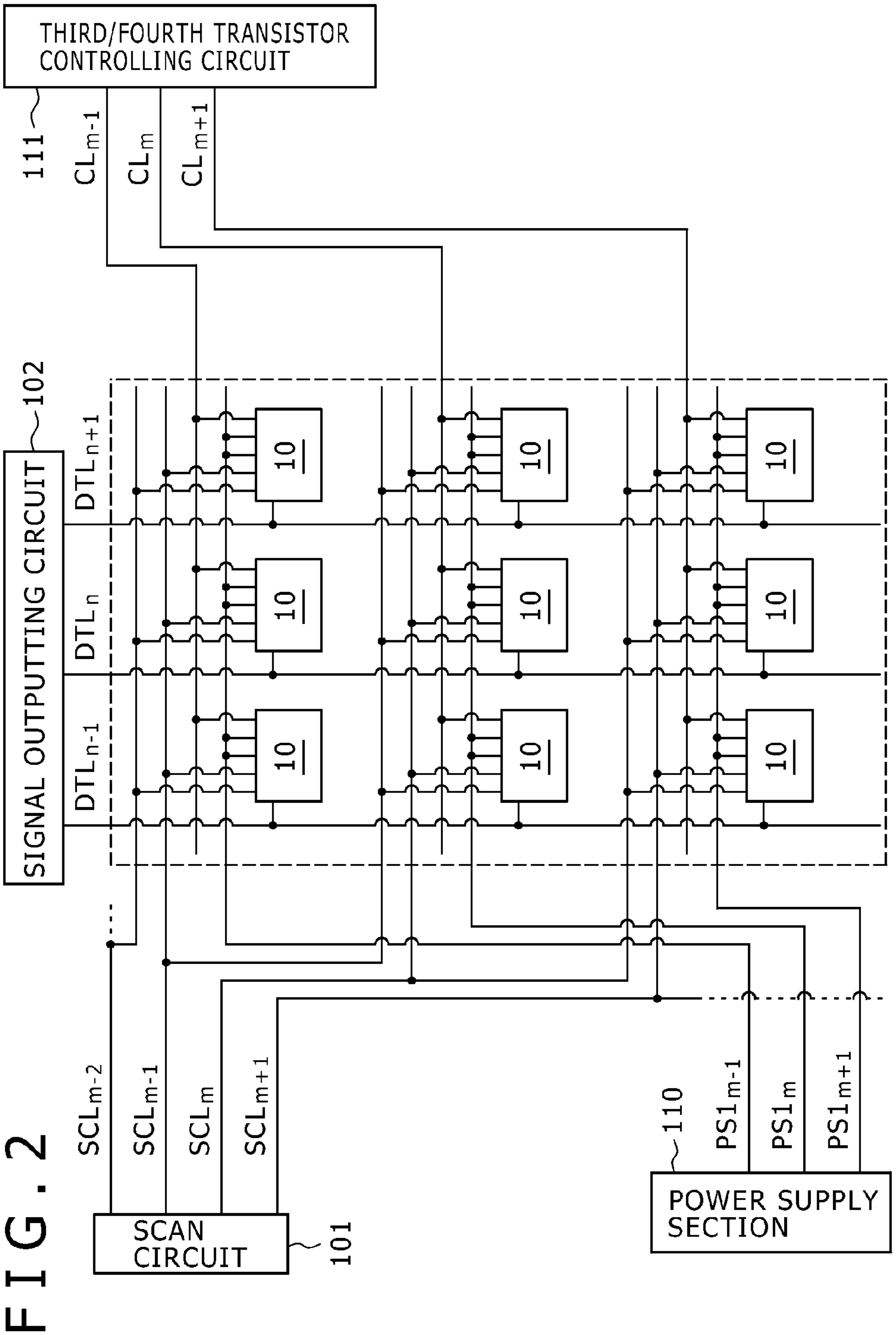
FIG. 2 is a conceptual diagram showing the display apparatus according to the first embodiment.

The display apparatus according to the first embodiment is a display apparatus employing a plurality of pixel circuits. Every pixel circuit is configured to include a plurality of sub-pixel circuits. Every sub-pixel circuit is the light emitting unit 10 which has a laminated structure composed of the driving circuit 11 and the light emitting device ELP connected to the driving circuit 11. FIG. 1 is a diagram showing an equivalent circuit of the driving circuit 11 employed in the light emitting unit 10 located at the intersection of an mth matrix row and an nth matrix column in a two-dimensional matrix in which N×M light emitting units 10 employed in a display apparatus are laid out to form a two-dimensional matrix composed of N columns and M rows where suffix or notation m denotes an integer having a value of 1, 2, . . . or M and notation n denotes an integer having a value of 1, 2, . . . or N. FIG. 2 is a conceptual diagram showing the display apparatus.

As shown in the conceptual diagram of FIG. 2, the display apparatus employs:

(1): N×M light emitting units 10 laid out to form a two-dimensional matrix composed of N matrix columns oriented in a first direction and M matrix rows oriented in a second direction;

(2): M scan lines SCL each stretched in the first direction; and (3): N data lines DTL each stretched in the second direction.

Each of the scan lines SCL is connected to a scan circuit 101 whereas each of the data lines DTL is connected to a signal outputting circuit 102. The conceptual diagram of FIG. 2 shows 3×3 light emitting units 10 centered at a light emitting unit 10 located at the intersection of the mth matrix row and the nth matrix column. It is to be noted, however, that the configuration shown in the conceptual diagram of FIG. 2 is no more than a typical configuration. In addition, the conceptual diagram of FIG. 2 does not show the power-supply line PS2 for conveying the cathode voltage $V_{Cat}$ as shown in the diagram of FIG. 1.

In the case of a color display apparatus, the two-dimensional matrix composed of N matrix columns and M matrix rows has (N/3)×M pixel circuits. However, every pixel circuit is configured to include three sub-pixels, i.e., a red-light emitting sub-pixel, a green-light emitting sub-pixel and a blue-light emitting sub-pixel. Thus, the two-dimensional matrix has N×M sub-pixel circuits which are each the light emitting unit 10 described above. The light emitting units 10 are sequentially scanned by the scan circuit 101 in row units on a row-after-row basis at a display frame rate of FR times per second. That is to say, (N/3) pixel circuits (or N sub-pixel circuits each functioning as the light emitting unit 10) arranged along the mth matrix row are driven at the same time where suffix or notation m denotes an integer having a value of 1, 2, . . . or M. In other words, the light emission and no-light emission timings of the N light emitting devices 10 arranged along the mth matrix row are controlled in the same way.

The light emitting unit 10 employs a driving circuit 11 and a light emitting device ELP. The driving circuit 11 has a signal writing transistor $TR_W$, a device driving transistor $TR_D$, a capacitor $C_1$ and a first switch circuit $SW_1$ which is a first transistor $TR_1$ to be described later. A driving current generated by the device driving transistor $TR_D$ flows to the light emitting device ELP. In the light emitting unit 10 located at the intersection of mth matrix row and the nth matrix column, a specific one of the source and drain areas of the signal writing transistor $TR_W$ is connected to the data line $DTL_n$ whereas the gate electrode of the signal writing transistor $TR_W$ is connected to the scan line $SCL_m$. A specific one of the source and drain areas of the device driving transistor $TR_D$ is connected to the other one of the source and drain areas of the signal writing transistor $TR_W$ through a first node $ND_1$. A specific one of the terminals of the capacitor $C_1$ is connected to the second power-supply line PS2 for conveying a reference voltage determined in advance. In the case of the first embodiment shown in the diagram of FIG. 1, the reference voltage determined in advance is a predetermined cathode voltage $V_{Cat}$ to be described later. The other one of the terminals of the capacitor $C_1$ is connected to the gate electrode of the device driving transistor $TR_D$ through a second node $ND_2$.

Each of the device driving transistor $TR_D$ and the signal writing transistor $TR_W$ is a TFT of the p-channel type. The device driving transistor $TR_D$ is a depletion-type transistor. As will be described later, each of the first transistor $TR_1$, the second transistor $TR_2$, the third transistor $TR_3$ and the fourth transistor $TR_4$ is also a TFT of the p-channel type. It is to be noted that the signal writing transistor $TR_W$ can be implemented as a TFT of the n-channel type.

A commonly known configuration and a commonly known structure can be used respectively as the configuration and structure of each of the scan circuit 101, the signal outputting circuit 102, the scan line SCL and the data line DTL.

In the same way as the scan lines SCL, M first power-supply lines PS1 each stretched in the first direction are connected to the power-supply section 110. The power-supply section 110 asserts a predetermined initialization voltage $V_{Ini}$ to be described later or a driving voltage $V_{CC}$ also to be described later on each of the first power-supply lines PS1. A commonly known configuration and a commonly known structure can be adopted respectively as the configuration and structure of each of the first power-supply line PS1 and the power-supply section 110. It is to be noted that, by the same token, a commonly known configuration and a commonly known structure can be adopted respectively as the configuration and structure of the second power-supply line PS2.

A commonly known configuration and a commonly known structure can be adopted respectively as the configuration and structure of each of M third/fourth-transistor control lines CL which are each stretched in the first direction in the same way as the scan lines SCL. The M third/fourth-transistor control lines CL are connected to a third/fourth-transistor controlling circuit 111. By the same token, a commonly known configuration and a commonly known structure can be adopted respectively as the configuration and structure of the third/fourth-transistor controlling circuit 111.

Figure 3:
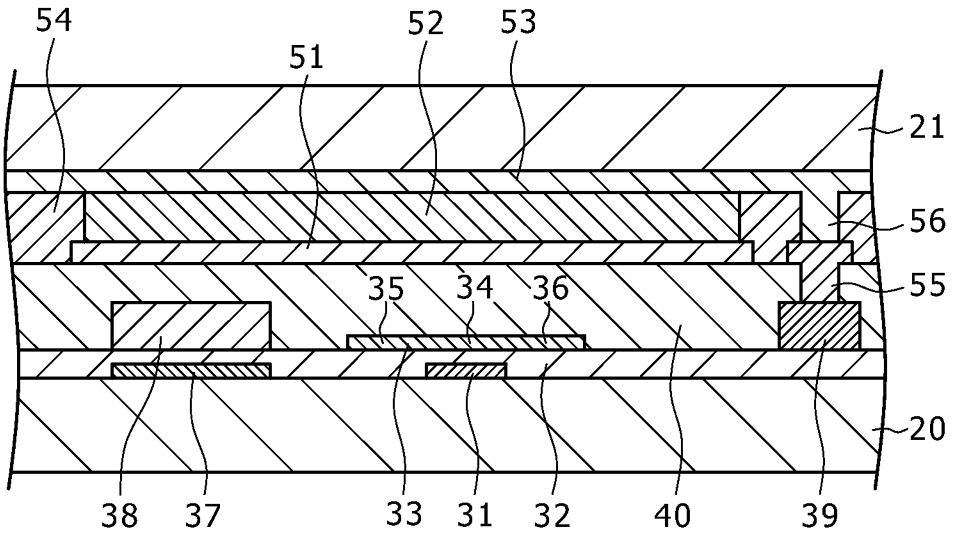
FIG. 3 is a model cross-sectional diagram showing the cross section of a portion of the light emitting unit employed in the display apparatus shown in the conceptual diagram of FIG. 2.

FIG. 3 is a model cross-sectional diagram showing the cross section of a portion of the light emitting unit 10 employed in the display apparatus shown in the conceptual diagram of FIG. 2. As will be described later in detail, every transistor and the capacitor $C_1$ which are employed in the driving circuit 11 of the light emitting unit 10 are created on a support body 20 whereas the light emitting device ELP is created over the transistors and the capacitor $C_1$. Typically, a first inter-layer insulation layer 40 is sandwiched between the light emitting device ELP and the driving circuit 11 which employs the transistors and the capacitor $C_1$. The organic EL light emitting device ELP has a commonly known configuration and a commonly known structure which include components such as an anode electrode, a hole transport layer, a light emitting layer, an electron transport layer and a cathode electrode. It is to be noted that the model cross-sectional diagram of FIG. 3 shows only the device driving transistor $TR_D$ while the other transistors are concealed and, thus, invisible. The other one of the source and drain areas of the device driving transistor $TR_D$ is connected to the anode electrode of the light emitting device ELP through the fourth transistor $TR_4$ not shown in the model cross-sectional diagram of FIG. 3. A portion connecting the fourth transistor $TR_4$ to the anode electrode of the light emitting device ELP is also concealed and, thus, invisible in the model cross-sectional diagram of FIG. 3.

The device driving transistor $TR_D$ is configured to include a gate electrode 31, a gate insulation layer 32 and a semiconductor layer 33. To put it more concretely, the device driving transistor $TR_D$ has a specific source or drain area 35 and the other source or drain area 36 which are provided on the semiconductor layer 33 as well as a channel creation area 34. Sandwiched by the specific source or drain area 35 and the other source or drain area 36, the channel creation area 34 is a portion pertaining to the semiconductor layer 33. Each of the other transistors not shown in the model cross-sectional diagram of FIG. 3 has the same configuration as the device driving transistor $TR_D$.

The capacitor $C_1$ has a capacitor electrode 37, a dielectric layer composed of an extension of the gate insulation layer 32 and another capacitor electrode 38. It is to be noted that a portion connecting the capacitor electrode 37 to the gate electrode 31 of the device driving transistor $TR_D$ and a portion connecting the capacitor electrode 38 to the second power-supply line PS2 are concealed and, thus, invisible.

The gate electrode 31 of the device driving transistor $TR_D$, a portion of the gate insulation layer 32 of the device driving transistor $TR_D$ and capacitor electrode 37 of the capacitor $C_1$ are created on the support body 20. Components such as the device driving transistor $TR_D$ and the capacitor $C_1$ are covered by the first inter-layer insulation layer 40. On the first inter-layer insulation layer 40, the light emitting device ELP is provided. The light emitting device ELP has an anode electrode 51, a hole transport layer, a light emitting layer, an electron transport layer and a cathode electrode 53. It is to be noted that, in the model cross-sectional diagram of FIG. 3, the hole transport layer, the light emitting layer and the electron transport layer are shown as a single layer 52. On a portion pertaining to the first inter-layer insulation layer 40 as a portion on which the light emitting device ELP does not exist, a second inter-layer insulation layer 54 is provided. On the second inter-layer insulation layer 54 and the cathode electrode 53, a transparent substrate 21 is placed. Light emitted by the light emitting layer is radiated to the outside of the light emitting unit 10 by way of the transparent substrate 21. The cathode electrode 53 and the wire 39 serving as the second power-supply line PS2 are connected to each other by contact holes 56 and 55 provided on the second inter-layer insulation layer 54 and the first inter-layer insulation layer 40.

A method for manufacturing the display apparatus shown in the conceptual diagram of FIG. 2 is explained as follows. First of all, components are created properly on the support body 20 by adoption of an already known method. The components include lines such as the scan lines, the electrodes of the capacitor $C_1$, the transistors each made of semiconductor layers, the inter-layer insulation layers and contact holes. Then, film-creation and patterning processes are carried out also by adoption of an already known method in order to form the light emitting device ELP. Subsequently, the support body 20 completing the processes described above is positioned to face the transparent substrate 21. Finally the surroundings of the support body 20 and the transparent substrate 21 are sealed in order to finish the process of manufacturing the display apparatus. Later on, if necessary, wiring to external circuits is provided.

Next, by referring to the diagrams of FIGS. 1 and 2, the following description explains the driving circuit 11 employed in the light emitting unit 10 located at the intersection of the mth matrix row and the nth matrix column. As described before, the other one of the source and drain areas of the signal writing transistor $TR_W$ is connected to the specific one of the source and drain areas of the device driving transistor $TR_D$. On the other hand, the specific one of the source and drain areas of the signal writing transistor $TR_W$ is connected to the data line $DTL_n$. Operations to put the signal writing transistor $TR_W$ in a turned-on and turned-off states are controlled by a signal asserted on the scan line $SCL_m$ connected to the gate electrode of the signal writing transistor $TR_W$.

As will be described later in detail, the signal outputting circuit 102 asserts a video signal $V_{Sig}$ for controlling the luminance of light emitted by the light emitting device ELP on the data line $DTL_n$. The video signal $V_{Sig}$ is also referred to as a driving signal or a luminance signal.

In a light emission state of the light emitting unit 10, the device driving transistor $TR_D$ is driven to generate a source-to-drain current $I_{ds}$ the magnitude of which is expressed by Eq. (1) given below. In the light emission state of the light emitting unit 10, the specific one of the source and drain areas of the device driving transistor $TR_D$ is functioning as the source area whereas the other one of the source and drain areas of the device driving transistor $TR_D$ is functioning as the drain area. In order to make the following description easy to write just for the sake of convenience, in the following description, the specific one of the source and drain areas of the device driving transistor $TR_D$ is referred to as the source area whereas the other one of the source and drain areas of the device driving transistor $TR_D$ is referred to as the drain area in some cases. In Eq. (1) given below, reference notation μ denotes the effective mobility of the device driving transistor $TR_D$ whereas reference notation L denotes the length of the channel of the device driving transistor $TR_D$. Reference notation W denotes the width of the channel of the device driving transistor $TR_D$. Reference notation $V_{gs}$ denotes a voltage applied between the source area of the device driving transistor $TR_D$ and the gate electrode of the same transistor. Reference notation $V_{th}$ denotes the threshold voltage of the device driving transistor $TR_D$. Reference notation $C_{0X}$ denotes a quantity expressed by the following expression:

(Specific dielectric constant of the gate insulation layer of the device driving transistor $TR_D$)× (Vacuum dielectric constant)/(Thickness of the gate insulation layer of the device driving transistor $TR_D$)

Reference notation k denotes an expression as follows:

$$k \equiv (1/2)*(W/L)*C_{0X}$$

$$I_{ds} = k*\mu*(V_{gs} - V_{th})^2 \quad (1)$$

The driving circuit 11 is provided with a first switch circuit $SW_1$ connected between the second node $ND_2$ and the other one of the source and drain areas of the device driving transistor $TR_D$. The first switch circuit $SW_1$ is implemented as the first transistor $TR_1$. The specific one of the source and drain areas of the first transistor $TR_1$ is connected to the second node $ND_2$ whereas the other one of the source and drain areas of the first transistor $TR_1$ is connected to the other one of the source and drain areas of the device driving transistor $TR_D$. In the same way as the driving circuit described earlier by referring to the diagram of FIG. 10 in the section having a title of "BACKGROUND OF THE INVENTION," in the case of the first embodiment, the gate electrode of the first transistor $TR_1$ is connected to the scan line $SCL_m$. Each of the first transistor $TR_1$ and the signal writing transistor $TR_W$ is controlled by a signal asserted on the scan line $SCL_m$.

In addition, the driving circuit 11 is provided with a second switch circuit $SW_2$ connected between the second node $ND_2$ and the first power-supply line $PS1_m$. The second switch circuit $SW_2$ is implemented as the second transistor $TR_2$. A specific one of the source and drain areas of the second transistor $TR_2$ is connected to the first power-supply line $PS1_m$ whereas the other one of the source and drain areas of the second transistor $TR_2$ is connected to the second node $ND_2$.

The wiring connections of the second transistor $TR_2$ are described as follows. The gate electrode of the second transistor $TR_2$ serving as the second switch circuit $SW_2$ employed in the driving circuit 11 of the light emitting unit 10 provided for the mth matrix row associated with the scan line $SCL_m$ is connected to the scan line $SCL_{m\_pre\_P}$ provided for a matrix row preceding the mth matrix row by P matrix rows where: suffix or notation m denotes an integer having a value of 1, 2, . . . or M; and notation P is an integer determined in advance for the display apparatus as an integer satisfying relations of $1 \leqq P < M$. That is to say, the second switch circuit $SW_2$ is controlled by a scan signal asserted on the scan line $SCL_{m\_pre\_P}$. It is to be noted that, in the case of this embodiment, the integer P is set at 1 (that is, P=1). That is to say, a scan signal asserted on the scan line $SCL_{m-1}$ provided for a matrix row immediately preceding the mth matrix row is supplied to the gate electrode of the second transistor $TR_2$.

In the case of the driving circuit described earlier by referring to the diagram of FIG. 10 in the section having a title of "BACKGROUND OF THE INVENTION," a fixed voltage is asserted on the first power-supply line PS1. In the case of the first embodiment, on the other hand, in accordance with an operation carried out by the power-supply section 110, the voltage asserted on the first power-supply line $PS\mathbf{1}_m$ can be an initialization voltage $V_{Ini}$ to be described later or a driving voltage $V_{CC}$ also to be described later. Concrete operations will be explained later in detail.

In addition, the driving circuit 11 is also provided with a third switch circuit $SW_3$ connected between the first node $ND_1$ and the first power-supply line $PS\mathbf{1}_m$. On top of that, the driving circuit 11 is further provided with a fourth switch circuit $SW_4$ connected between the other one of the source and drain areas of the device driving transistor $TR_D$ and a specific one of the electrodes of the light emitting device ELP. The third switch circuit $SW_3$ is implemented as the third transistor $TR_3$. A specific one of the source and drain areas of the third transistor $TR_3$ is connected to the first power-supply line $PS\mathbf{1}_m$ whereas the other one of the source and drain areas of the third transistor $TR_3$ is connected to the first node $ND_1$. The fourth switch circuit $SW_4$ is implemented as the fourth transistor $TR_4$. A specific one of the source and drain areas of the fourth transistor $TR_4$ is connected to the other one of the source and drain areas of the device driving transistor $TR_D$ whereas the other one of the source and drain areas of the fourth transistor $TR_4$ is connected to the specific one of the electrodes of the light emitting device ELP. The other electrode of the light emitting device ELP is the cathode electrode of the light emitting device ELP. The cathode electrode of the light emitting device ELP is connected to the second power-supply line PS2 for conveying a cathode voltage $V_{Cat}$ to be described later. Reference notation $C_{EL}$ denotes the parasitic capacitance of the light emitting device ELP.

Figure 10:
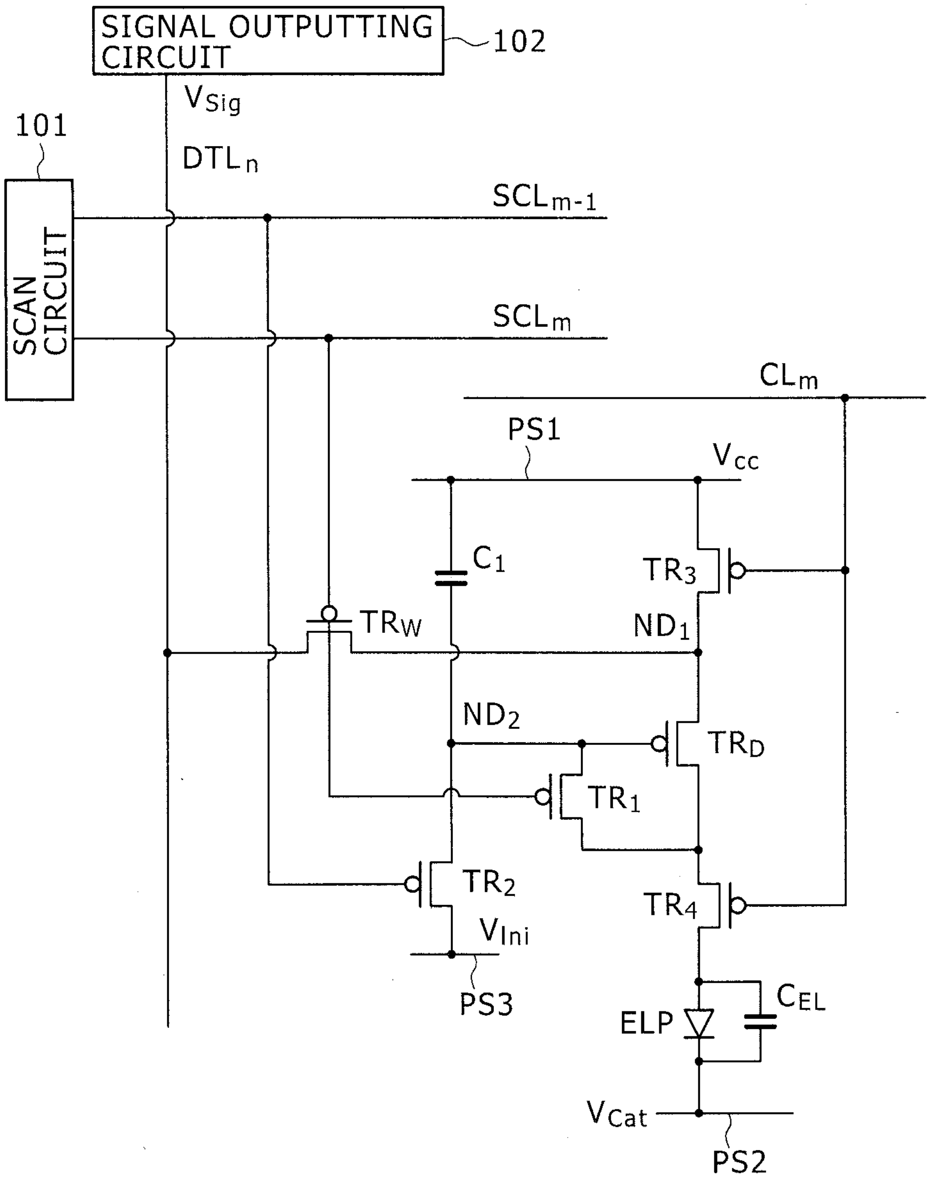
FIG. 10 RELATED ART
FIG. 10 is a diagram showing the equivalent circuit of a driving circuit included in a light emitting unit located at the intersection of an mth matrix row and an nth matrix column in a two-dimensional matrix of N×M light emitting units employed in a display apparatus.
Figure 11A:
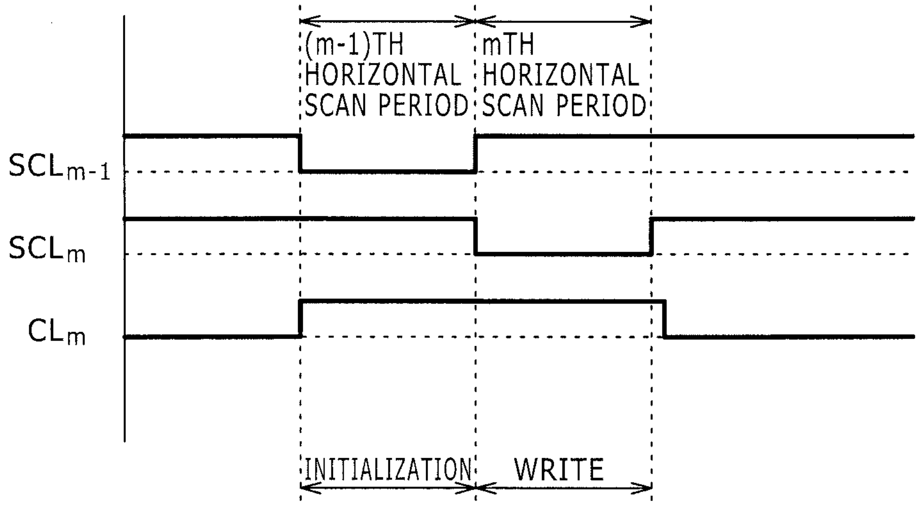
FIG.11A RELATED ART
FIG. 11A is a model timing diagram showing timing charts of signals appearing on a scan line $SCL_{m-1}$, a scan line $SCL_m$ and a third/fourth-transistor control line $CL_m$.
Figure 11B:
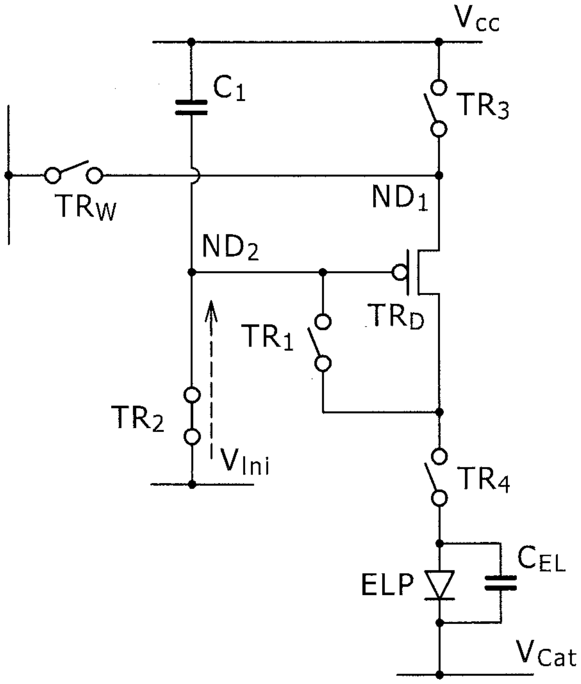
FIG.11B RELATED ART
FIG. 11B to 11D are model circuit diagrams showing turned-on and turned-off states of transistors in the driving circuit.
Figure 11C:
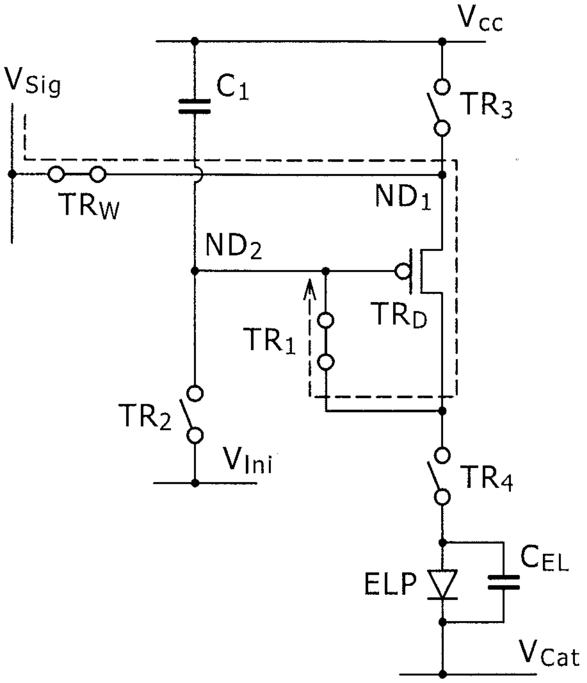
FIG. 11C RELATED ART
Figure 11D:
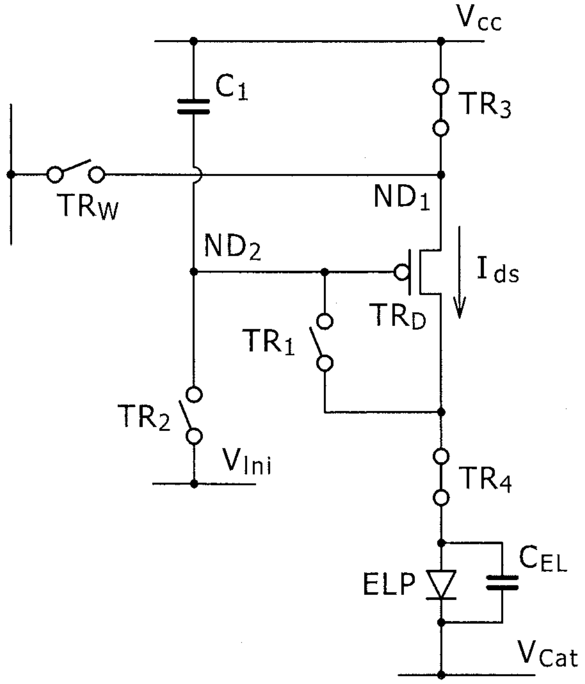
FIG. 11D RELATED ART

In the same way as the driving circuit described earlier in the section with a title of "BACKGROUND OF THE INVENTION" by referring to the diagram shown in FIG. 10, in the first embodiment, the gate electrodes of the third transistor $TR_3$ and the fourth transistor $TR_4$ are connected to the third/fourth-transistor control line $CL_m$. The third/fourth-transistor control line $CL_m$ is connected to the third/fourth-transistor controlling circuit 111. The third/fourth-transistor controlling circuit 111 supplies a signal to the gate electrodes of the third transistor $TR_3$ and the fourth transistor $TR_4$ through the third/fourth-transistor control line $CL_m$ in order to put the third transistor $TR_3$ and the fourth transistor $TR_4$ in a turned-on state or a turned-off state.

In the explanation of the first an other embodiments, a variety of voltages and electric potentials have the following typical values even though the values shall be regarded as values merely used in the explanation and are not to be interpreted as limitations imposed on the voltages and the electric potentials.

Reference notation $V_{Sig}$ denotes a video signal for controlling the luminance of light emitted by the light emitting device ELP. The video signal $V_{Sig}$ has a typical value in the range 0 volt representing the maximum luminance to 8 volts representing the minimum luminance.

Reference notation $V_{CC}$ denotes a driving voltage. The reference voltage $V_{CC}$ has a typical value of 10 volts.

Reference notation Vini denotes an initialization voltage serves as a voltage for initializing an electric potential appearing on the second node $ND_2$. The initialization voltage $V_{Ini}$ has a typical value of −4 volts.

Reference notation $V_{th}$ denotes the threshold voltage of the device driving transistor $TR_D$. The threshold voltage $V_{th}$ has a typical value of 2 volts.

Reference notation $V_{Cat}$ denotes a voltage applied to the second power-supply line PS2. The cathode voltage $V_{Cat}$ has a typical value of −10 volts.

The following description explains driving operations carried out by the display apparatus on the light emitting unit 10 located at the intersection of the mth matrix row and the nth matrix column. In the following description, the light emitting unit 10 located at the intersection of the mth matrix row and the nth matrix column is also referred to simply as the (n, m)th light emitting unit 10 or the (n, m)th sub-pixel circuit. The horizontal scan period of the light emitting units 10 arranged along the mth matrix row is referred to hereafter simply as the mth horizontal scan period. To put it more concretely, the horizontal scan period of the light emitting units 10 arranged along the mth matrix row is the mth horizontal scan period of a currently displayed frame. The driving operations described below are also carried out on other embodiments to be described later.

Figure 4:
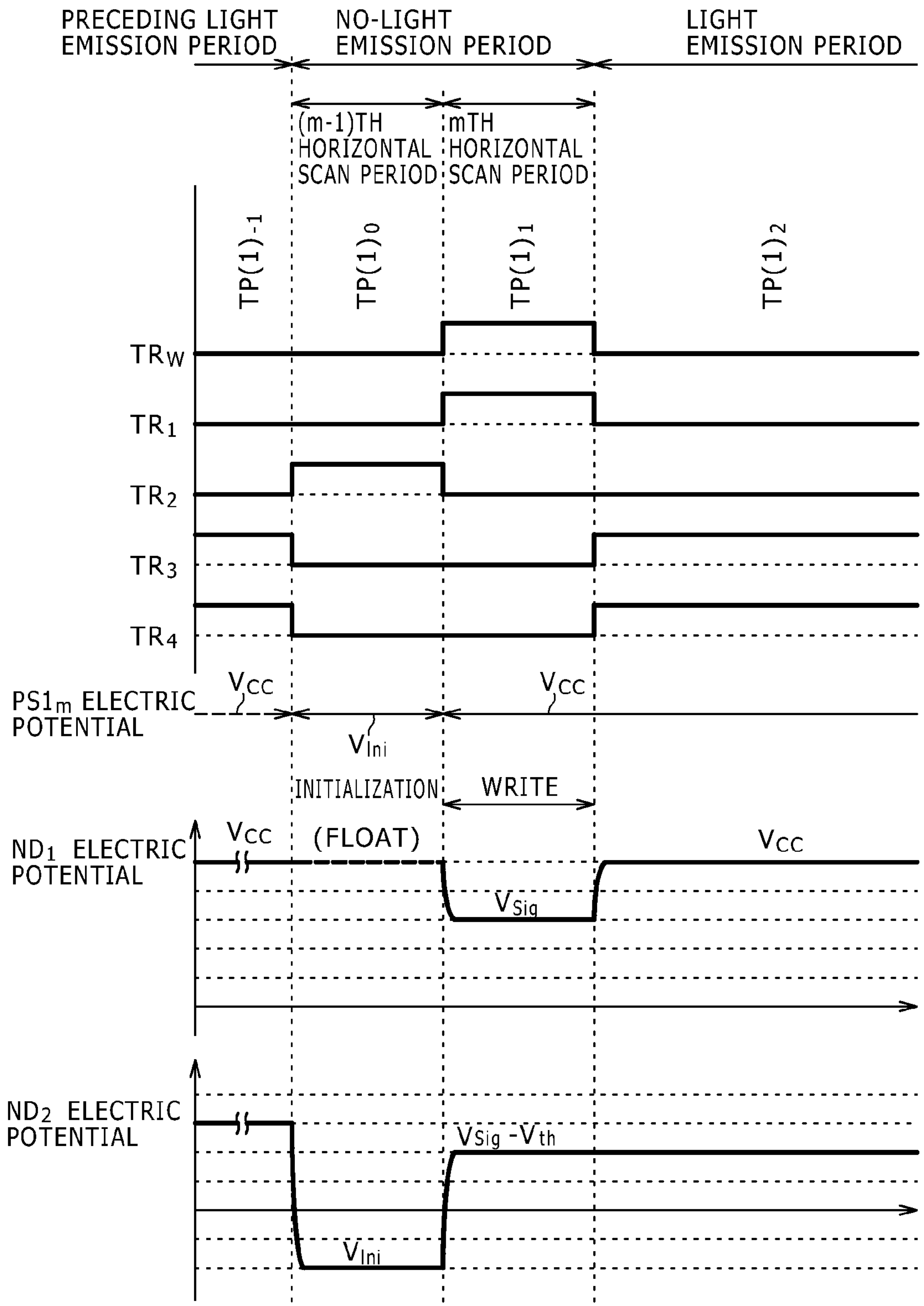
FIG. 4 is a timing diagram showing a model of timing charts of signals involved in driving operations carried out by the display apparatus according to the first embodiment.
Figure 5A:
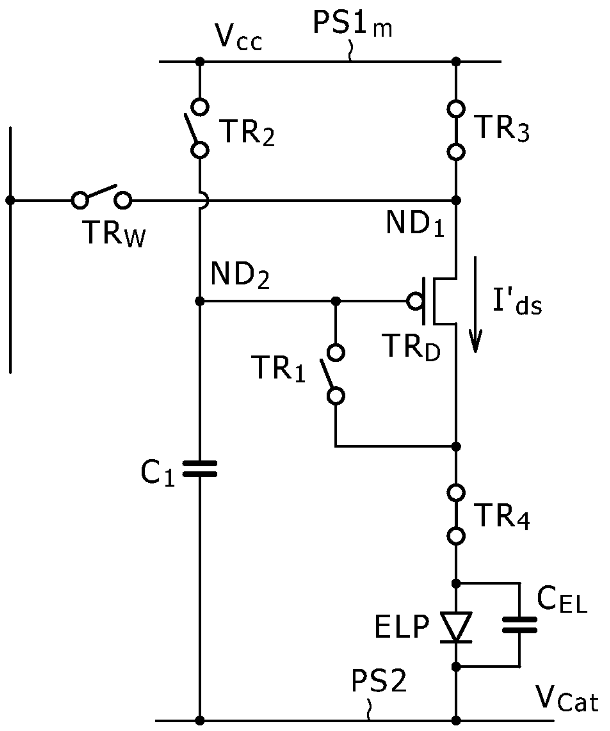
FIGS. 5A to 5D are model circuit diagrams showing turned-on and turned-off states of transistors in the driving circuit.
Figure 5B:
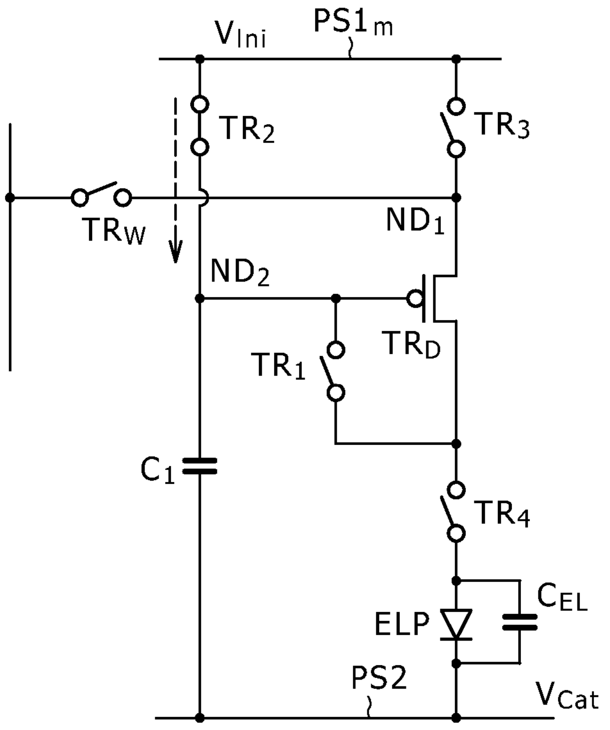

A model of timing charts of signals involved in the driving operations carried out by the display apparatus is shown in the timing diagram of FIG. 4. FIGS. 5A and 5B are a plurality of model circuit diagrams referred to in description of driving operations carried out by the display apparatus. To be more specific, FIGS. 5A to 5D are model circuit diagrams showing turned-on and turned-off states of transistors in the driving circuit 11.

The driving method for the driving apparatus according to the first embodiment has a second-node electric-potential initialization process of applying a predetermined initialization voltage $V_{Ini}$ appearing on the power-supply line $PS\mathbf{1}_m$ to the second node $ND_2$ by way of the second switch circuit $SW_2$ put in a turned-on state and, then, putting the second switch circuit $SW_2$ in a turned-off state in order to set an electric potential appearing on the second node $ND_2$ at a reference electric potential determined in advance. To put it more concretely, the second-node electric-potential initialization process is carried out during a period $TP(\mathbf{1})_0$ shown in the timing diagram of FIG. 4.

The driving method for the driving apparatus according to the first embodiment has a light emission process of sustaining the second switch circuit $SW_2$ in a turned-off state and applying a predetermined driving voltage $V_{CC}$ appearing on the power-supply line $PS\mathbf{1}_m$ to the first node $ND_1$ in order to allow a driving current to flow from the device driving transistor $TR_D$ to the light emitting device ELP so as to drive the light emitting device ELP to emit light. It is to be noted that the signal writing process is carried out and, then, the light emission process is performed. To put it more concretely, the signal writing process is carried out during a period $TP(\mathbf{1})_1$ shown in the timing diagram of FIG. 4 whereas the light emission process is performed during a period $TP_1(\mathbf{1})_2$ lagging behind the period $TP(\mathbf{1})_1$ as shown in the same timing diagram.

The driving method according to the first embodiment has a signal writing process of changing an electric potential appearing on the second node $ND_2$ toward an electric potential, which is obtained as a result of subtracting the threshold voltage $V_{th}$ of the device driving transistor $TR_D$ from the voltage of a video signal $V_{Sig}$ appearing the data line $DTL_n$, by applying the video signal $V_{Sig}$ to the first node $ND_1$ by way of the signal writing transistor $TR_W$ which is put in a turned-on state by a signal appearing the scan line $SCL_m$ when the first switch circuit $SW_1$ is put in a turned-on state in order to put the second node $ND_2$ in a state of being electrically connected to the other one of the source and drain areas of the device driving transistor $TR_D$. It is to be noted that, after a second-node electric-potential initialization process has been completed, the signal writing process is carried out prior to execution of the light emission process described above. To put it more concretely, the signal writing process is carried out during a period $TP(\mathbf{1})_1$ shown in the timing diagram of FIG. 4.

In the case of the driving circuit described earlier by referring to the diagram of FIG. 10 in the section having a title of "BACKGROUND OF THE INVENTION," a fixed voltage is asserted on the first power-supply line PS1. In the case of the first embodiment, on the other hand, the power-supply section 110 asserts an initialization voltage $V_{Ini}$ determined in advance on the first power-supply line PS1$_m$ connected to the (n, m)th light emitting unit 10 during the (m−1)th horizontal scan period and, during the (m+1)th horizontal scan period allocated to the light emission process, the power-supply section 110 asserts a driving voltage $V_{CC}$ determined in advance on the first power-supply line PS1$_m$. During the mth horizontal scan period allocated to the signal writing process, the power-supply section 110 may assert the initialization voltage $V_{Ini}$ or the driving voltage $V_{CC}$ on the first power-supply line PS1$_m$. In the case of the first embodiment and other embodiments to be described later, during periods other than the (m−1)th horizontal scan period, the power-supply section 110 asserts the driving voltage $V_{CC}$ on the first power-supply line PS1$_m$. The following description explains details of an operation carried out in every period shown in the timing diagram of FIG. 4.

Period $TP(\mathbf{1})_{-1}$ (With Reference to FIGS. 4 and 5A)

The period $TP(\mathbf{1})_{-1}$ serving as the period of a light emission process is the period in which the light emitting unit 10 serving as the (n, m)th sub-pixel circuit is in an immediately preceding light emission state of emitting light at a luminance according to a video signal $V'_{Sig}$ written right before. A driving voltage $V_{CC}$ determined in advance has been asserted on the first power-supply line PS1$_m$. Each of the third transistor $TR_3$ and the fourth transistor $TR_4$ is put in a turned-on state whereas each of the signal writing transistor $TR_W$, the first transistor $TR_1$ and the second transistor $TR_2$ is conversely put in a turned-off state. Through the light emitting device ELP employed in the light emitting unit 10 serving as the (n, m)th sub-pixel circuit, the source-to-drain current $I'_{ds}$ expressed by Eq. (4) to be described later is flowing. Thus, the light emitting device ELP employed in the light emitting unit 10 serving as the (n, m)th sub-pixel circuit is emitting light with a luminance determined by the source-to-drain current $I'_{ds}$.

Period $TP(\mathbf{1})_0$ (With Reference to FIGS. 4 and 5B)

The period $TP(\mathbf{1})_0$ serving as the period of the second-node electric-potential initialization process is the (m−1)th horizontal scan period of the currently displayed frame. An initialization voltage $V_{Ini}$ determined in advance has been asserted on the first power-supply line PS1$_m$. During the period $TP(\mathbf{1})_0$, each of the first switch circuit $SW_1$, the third switch circuit $SW_3$ and the fourth switch circuit $SW_4$ is sustained in a turned-off state. After the initialization voltage $V_{Ini}$ determined in advance is applied from the first power-supply line PS1$_m$ to the second node $ND_2$ by way of the second switch circuit $SW_2$ which has already been put in a turned-on state, the second switch circuit $SW_2$ is put in a turned-off state in order to set an electric potential appearing on the second node $ND_2$ at a predetermined reference voltage. The process of setting the electric potential appearing on the second node $ND_2$ at the initialization voltage $V_{Ini}$ determined in advance is referred to as the second-node electric-potential initialization process.

To put it more concretely, each of the signal writing transistor $TR_W$ and the first transistor $TR_1$ is sustained in a turned-off state whereas each of the third transistor $TR_3$ and the fourth transistor $TR_4$ is changed from a turned-on state to a turned-off state. Thus, the first node $ND_1$ is electrically disconnected from the first power-supply line PS1$_m$. In addition, the light emitting device ELP is electrically disconnected from the device driving transistor $TR_D$. As a result, the source-to-drain current $I_{ds}$ does not flow to the light emitting device ELP, putting the light emitting device ELP in a no-light emission state. In addition, the second transistor $TR_2$ is changed from a turned-off state to a turned-on state so that the initialization voltage $V_{Ini}$ determined in advance is applied from the first power-supply line PS1$_m$ to the second node $ND_2$ by way of the second transistor $TR_2$ put in a turned-on state. Then, the second transistor $TR_2$ is typically put in a turned-off state before the driving voltage $V_{CC}$ is asserted on the first power-supply line PS1$_m$. In this state, the other one of the terminals of the capacitor $C_1$ is connected to the second power-supply line PS2 conveying the cathode voltage $V_{Cat}$ so that an electric potential appearing on the other terminal of the capacitor $C_1$ is put in a state of being sustained. Thus, the electric potential appearing on the second node $ND_2$ is sustained at a predetermined level which is the level of the initialization voltage $V_{Ini}$ of −4 volts.

Figure 5C:
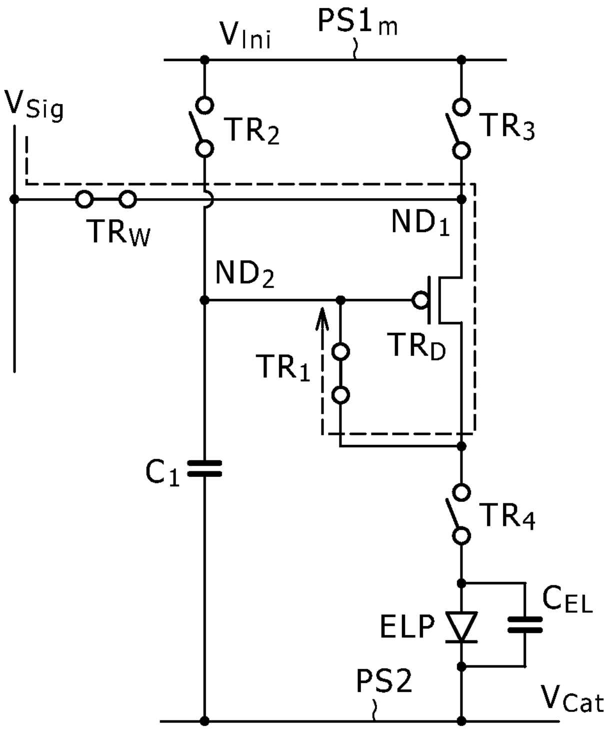

Period $TP(\mathbf{1})_1$ (With Reference to FIGS. 4 and 5C)

The period $TP(\mathbf{1})_1$ serving as the period of the signal writing process is the mth horizontal scan period of the currently displayed frame. In the period $TP_1$, each of the second switch circuit $SW_2$, the third switch circuit $SW_3$ and the fourth switch circuit $SW_4$ is sustained in a turned-off state whereas the first switch circuit $SW_1$ is conversely put in a turned-on state. With the first switch circuit $SW_1$ put in a turned-on state, the second node $ND_2$ is put in a state of being electrically connected to the other one of the source and drain areas of the device driving transistor $TR_D$ by way of the first switch circuit $SW_1$. In this state, the video signal $V_{Sig}$ asserted on the data line $DTL_n$ is supplied to the first node $ND_1$ by way of the signal writing transistor $TR_W$ which has already been put in a turned-on state by a signal asserted on the scan line $SCL_m$ so that the electric potential appearing on the second node $ND_2$ is raised toward a level obtained as a result of subtracting the threshold voltage $V_{th}$ of the device driving transistor $TR_D$ from the video signal $V_{Sig}$. The process of raising the electric potential appearing on the second node $ND_2$ toward such a level is referred to as the signal writing process.

To put it more concretely, each of the second transistor $TR_2$, the third transistor $TR_3$ and the fourth transistor $TR_4$ is sustained in a turned-off state whereas each of the signal writing transistor $TR_W$ and the first transistor $TR_1$ is put in a turned-on state by a signal asserted on the scan line $SCL_m$. With the first transistor $TR_1$ put in a turned-on state, the second node $ND_2$ is put in a state of being electrically connected to the other one of the source and drain areas of the device driving transistor $TR_D$ through the first transistor $TR_1$. In addition, the video signal $V_{Sig}$ asserted on the data line $DTL_n$ is supplied to the first node $ND_1$ by way of the signal writing transistor $TR_W$ which is put in a turned-on state by a signal asserted on the scan line $SCL_m$ so that the electric potential appearing on the second node $ND_2$ is changed to a level obtained as a result of subtracting the threshold voltage $V_{th}$ of the device driving transistor $TR_D$ from the video signal $V_{Sig}$.

That is to say, at the beginning of the period $TP(\mathbf{1})_1$, the electric potential appearing on the second node $ND_2$ has been initialized for putting the device driving transistor $TR_D$ in a turned-on state by carrying out the second-node electric-potential initialization process during the period $TP_0$. In the period $TP_1$, however, the electric potential appearing on the second node $ND_2$ is raised toward the electric potential of the video signal $V_{Sig}$ applied to the first node $ND_1$. As the difference in electric potential between the gate electrode of the device driving transistor $TR_D$ and the specific one of the source and drain areas of the device driving transistor $TR_D$ attains the threshold voltage $V_{th}$ of the device driving transistor $TR_D$, however, the device driving transistor $TR_D$ is put in a turned-off state. In this state, the electric potential $V_{ND2}$ appearing on the second node $ND_2$ becomes equal to about $(V_{Sig}-V_{th})$. That is to say, the electric potential $V_{ND2}$ appearing on the second node $ND_2$ can be expressed by Eq. (2) given below. It is to be noted that, prior to the beginning of the (m+1)th horizontal scan period, a signal appearing on the scan line $SCL_m$ puts each of the signal writing transistor $TR_W$ and the first transistor $TR_1$ in a turned-off state.

$$V_{ND2} \approx (V_{Sig}-V_{th}) \tag{2}$$

Figure 5D:
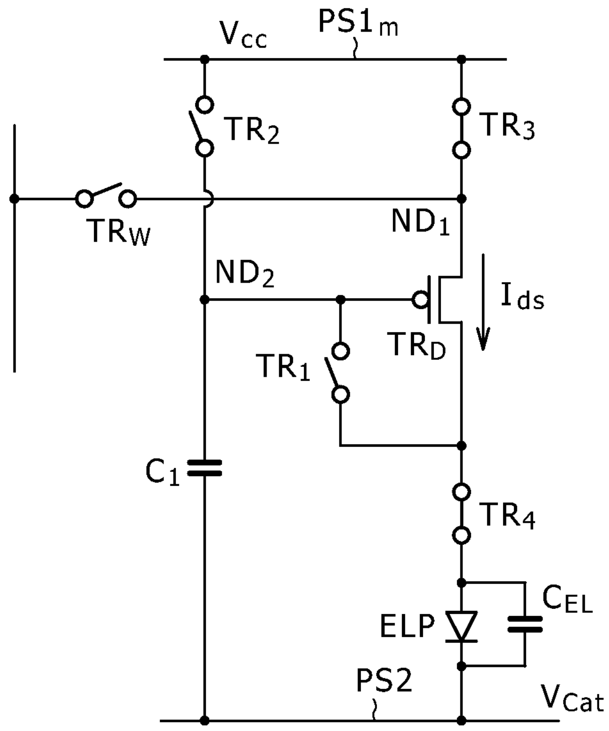

Period $TP(\mathbf{1})_2$ (With REFERENCE to FIGS. 4 and 5D)

A period $TP(\mathbf{1})_2$ following the period $TP(\mathbf{1})_1$ is the period of another light emission process. During the period $TP(\mathbf{1})_2$, the first switch circuit $SW_1$ is put in a turned-off state whereas the second switch circuit $SW_2$ is sustained in a turned-off state. The fourth switch circuit $SW_4$ put in a turned-on state puts the other one of the source and drain areas of the device driving transistor $TR_D$ in a state of being electrically connected the to a specific one of the electrodes of the light emitting device ELP. In addition, the predetermined reference voltage $V_{CC}$ asserted on the first power-supply line $PS\mathbf{1}_m$ is applied to the first node $ND_1$ by way of the third switch circuit $SW_3$ which has already been put in a turned-on state. In this state, the device driving transistor $TR_D$ allows a source-to-drain current $I_{ds}$ to flow to the light emitting device ELP. The process of allowing the source-to-drain current $I_{ds}$ to flow to the light emitting device ELP is referred to as the light emission process.

To put it more concretely, as described above, prior to the start of the (m+1)th horizontal scan period, the first transistor $TR_1$ is put in a turned-off state whereas the second transistor $TR_2$ is sustained in a turned-off state. A signal asserted on the third/fourth-transistor control line $CL_m$ changes the state of the third transistor $TR_3$ and the state of the fourth transistor $TR_4$ from a turned-off state to a turned-on state. In these states, the predetermined reference voltage $V_{CC}$ is applied to the first node $ND_1$ by way of the third transistor $TR_3$ which has already been put in the turned-on state. In addition, by changing the state of the fourth transistor $TR_4$ from a turned-off state to a turned-on state, the other one of the source and drain areas of the device driving transistor $TR_D$ is put in a state of being electrically connected to a specific one of the electrodes of the light emitting device ELP, allowing a source-to-drain current $I_{ds}$ generated by the device driving transistor $TR_D$ to flow to the light emitting device ELP to serve as a driving current for driving the light emitting device ELP to emit light.

Following Eq. (3) is derived from Eq. (2).

$$V_{gs} \approx V_{CC}-(V_{Sig}-V_{th}) \tag{3}$$

Thus, Eq. (1) can be changed to following Eq. (4).

$$\begin{aligned} I_{ds} &= k*\mu*(V_{gs}-V_{th})^2 \\ &= k*\mu*(V_{CC}-V_{Sig})^2 \end{aligned} \tag{4}$$

As is obvious from Eq. (4) given above, the source-to-drain current $I_{ds}$ flowing to the light emitting device ELP is proportional to the square of an electric-potential difference $(V_{CC}-V_{Sig})$. In other words, the source-to-drain current $I_{ds}$ flowing to the light emitting device ELP is not dependent on the threshold voltage $V_{th}$ of the device driving transistor $TR_D$. That is to say, the luminance (or the light quantity) of light emitted by the light emitting device ELP is not affected by the threshold voltage $V_{th}$ of the device driving transistor $TR_D$. The luminance of light emitted by the light emitting device ELP employed in the (n, m)th light emitting unit 10 is a value determined by the source-to-drain current $I_{ds}$ flowing to the light emitting device ELP.

The light emission state of the light emitting device ELP is sustained till the (m−1)th horizontal scan period of the immediately following frame. That is to say, the light emission state of the light emitting device ELP is sustained till the end of the period $TP(\mathbf{1})_{-1}$ of the immediately following frame.

At the end of the light emission state of the light emitting device ELP, the series of processes of driving the light emitting unit 10 serving as the (n, m)th sub-pixel circuit as described above is completed.

In the display apparatus according to the first embodiment, the predetermined initialization voltage $V_{Ini}$ asserted on the first power-supply line $PS\mathbf{1}_m$ is applied to the second node $ND_2$ by way of the second switch circuit $SW_2$. Thus, a separate power-supply line for supplying the initialization voltage $V_{Ini}$ determined in advance is not required in particular. As a result, the number of power-supply lines can be reduced.

In accordance with the driving method for driving the display apparatus according to the first embodiment, the second switch circuit $SW_2$ is put in a turned-on state with a timing adjusted to assertion of the initialization voltage $V_{Ini}$ determined in advance on the first power-supply line $PS\mathbf{1}_m$. When the driving voltage is asserted on the first power-supply line $PS\mathbf{1}_m$, the second switch circuit $SW_2$ is sustained in a turned-off state and the predetermined driving voltage $V_{CC}$ asserted on the first power-supply line $PS\mathbf{1}_m$ is applied to the first node $ND_1$ by way of the third switch circuit $SW_3$ put in a turned-on state. Thus, the display apparatus can be driven without raising any problems even if a separate power-supply line for supplying the initialization voltage $V_{Ini}$ determined in advance is eliminated.

Second Embodiment

A second embodiment also implements the display apparatus provided by the present invention and the driving method for driving the display apparatus. The second embodiment is obtained by modifying the first embodiment. The display apparatus according to the second embodiment is different from the display apparatus according to the first embodiment in that, in the case of the display apparatus according to the second embodiment, the first switch circuit $SW_1$ is controlled by a signal other than the signal asserted on the scan line $SCL_m$ and, in addition, the third switch circuit $SW_3$ and the fourth switch circuit $SW_4$ are controlled by signals different from each other.

The driving method according to the second embodiment is different from the driving method according to the first embodiment in that, in the case of the driving method according to the second embodiment, between the signal writing process and the light emission process, a second-node electric-potential correction process is carried out so as to change an electric potential appearing on the second node $ND_2$ by applying a voltage with a magnitude determined in advance to the first node $ND_1$ for a period determined in advance with the first switch circuit $SW_1$ already put in a turned-on state in order to put the second node $ND_2$ in a state of being electrically connected to the other one of the source and drain areas of the device driving transistor $TR_D$.

It is to be noted that, in the case of the second embodiment, the driving voltage is applied to the first node $ND_1$ as the voltage with a magnitude determined in advance. To put it more concretely, between the signal writing process and the light emission process which are explained in the description of the first embodiment, the second-node electric-potential correction process is carried out in order to change an electric potential appearing on the second node $ND_2$ by applying the driving voltage $V_{CC}$ as the voltage with a magnitude determined in advance to the first node $ND_1$ for a period determined in advance with the first switch circuit $SW_1$ sustained in a turned-on state, the second switch circuit $SW_2$ sustained in a turned-off state, the third switch circuit $SW_3$ put in a turned-on state and the second node $ND_2$ put in a state of being electrically connected to the other one of the source and drain areas of the device driving transistor $TR_D$ by the first switch circuit $SW_1$ already put in a turned-on state.

Figure 6:
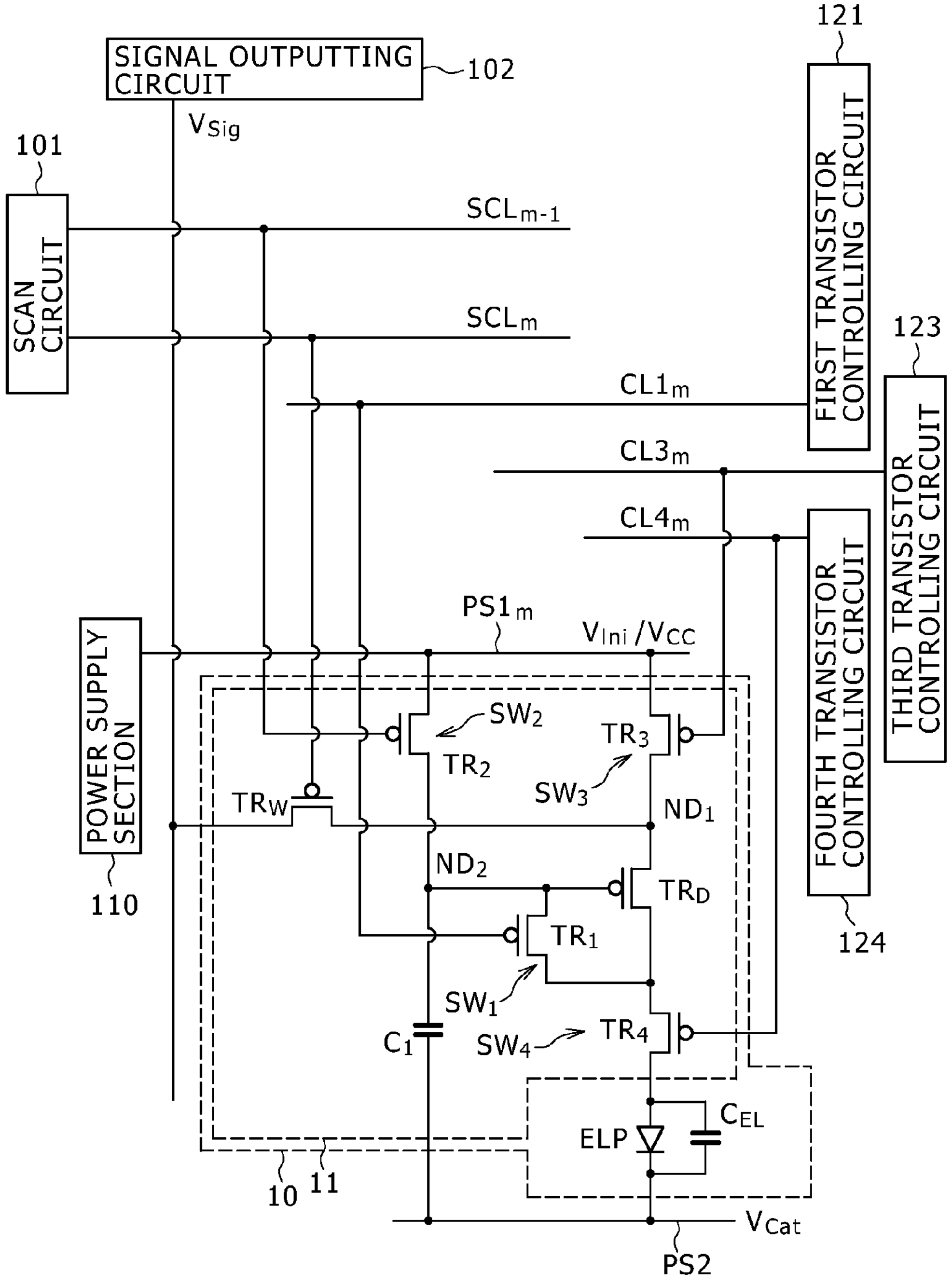
FIG. 6 is a diagram showing the equivalent circuit of a driving circuit included in a light emitting unit located at the intersection of an mth matrix row and an nth matrix column in a two-dimensional matrix of N×M light emitting units employed in a display apparatus according to a second embodiment.
Figure 7:
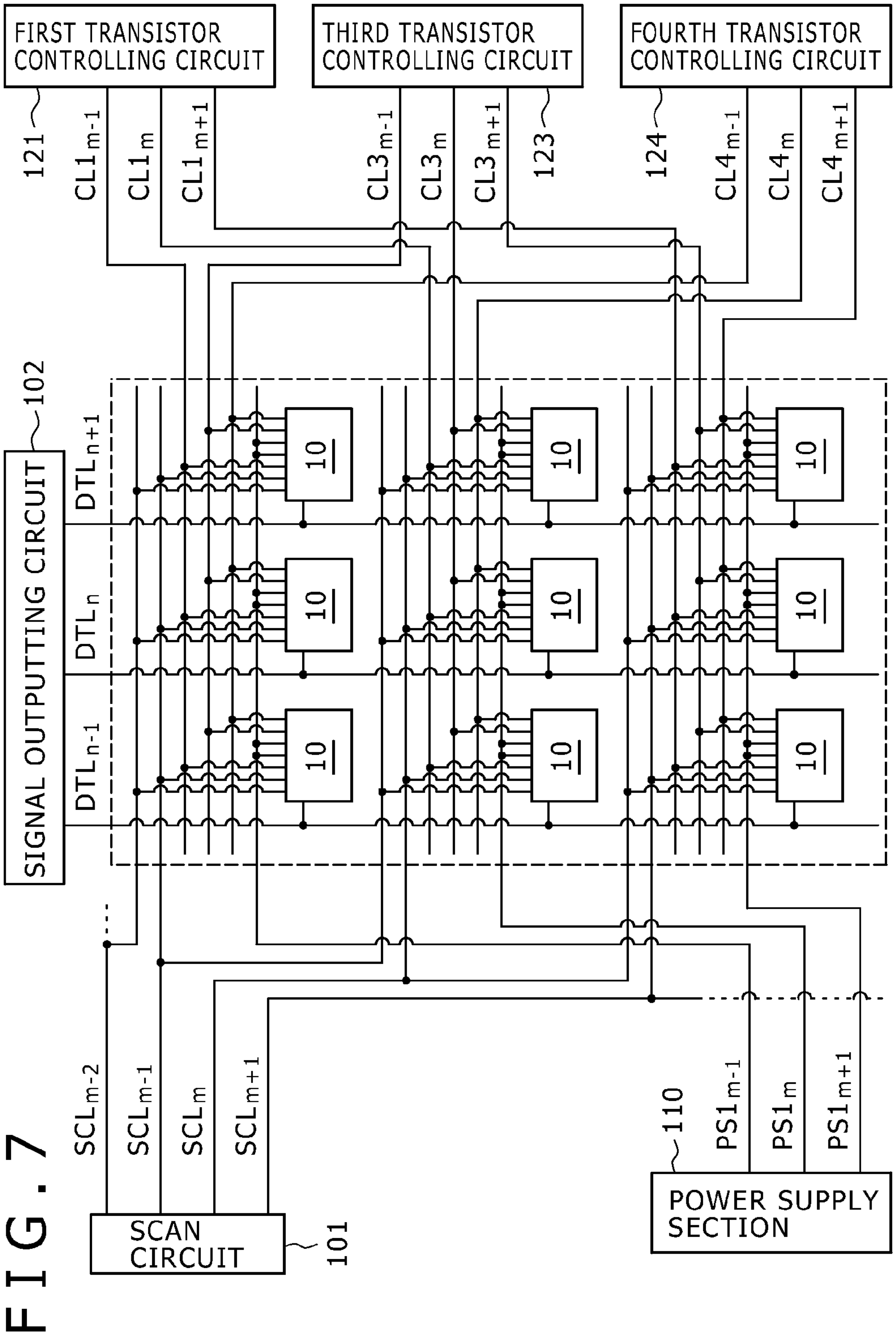
FIG. 7 is a conceptual diagram showing the display apparatus according to the second embodiment.

The display apparatus according to the second embodiment is also an organic EL (Electro Luminescence) display apparatus defined as a display apparatus employing light emitting units which each have an organic EL light emitting device and a driving circuit for driving the organic EL device. First of all, an outline of the organic EL display apparatus is explained. FIG. 6 is a diagram showing an equivalent circuit of the driving circuit 11 employed in the light emitting unit 10 at an intersection of the nth matrix column and the mth matrix row in a two-dimensional matrix of the display apparatus according to the second embodiment in which light emitting units are laid out to form the two-dimensional matrix. FIG. 7 is a conceptual diagram showing the display apparatus. The structure of the light emitting unit 10 employed in the second embodiment is identical with the structure of the light emitting unit 10 employed in the first embodiment.

The display apparatus according to the second embodiment is different from the display apparatus according to the first embodiment in that, in the case of the configuration of the display apparatus according to the second embodiment, the first switch circuit $SW_1$ is controlled by a signal other than the signal asserted on the scan line $SCL_m$ and, in addition, the third switch circuit $SW_3$ and the fourth switch circuit $SW_4$ are controlled by signals different from each other. Otherwise, the configuration of the display apparatus according to the second embodiment is identical with the configuration of the display apparatus according to the first embodiment. In the second embodiment, configuration elements identical with their respective counterparts employed in the first embodiment are denoted by the same reference notations and reference numerals as the counterparts, and explanation of the identical configuration elements is not repeated in order to avoid duplications of descriptions.

In the same way as the first embodiment, the display apparatus according to the first embodiment employs:

(1): N×M light emitting units 10 laid out to form a two-dimensional matrix composed of N matrix columns oriented in a first direction and M matrix rows oriented in a second direction;

(2): M scan lines SCL each stretched in the first direction; and (3): N data lines DTL each stretched in the second direction.

Each of the M scan lines SCL is connected to a scan circuit 101 whereas each of the N data lines DTL is connected to a signal outputting circuit 102. The conceptual diagram of FIG. 7 shows 3×3 light emitting units 10 centered at a light emitting unit 10 located at the intersection of the mth matrix row and the nth matrix column. It is to be noted, however, that the configuration shown in the conceptual diagram of FIG. 7 is no more than a typical configuration. In addition, the conceptual diagram of FIG. 7 does not show the second power-supply line PS2 for conveying the cathode voltage $V_{Cat}$ as shown in the diagram of FIG. 6.

In the case of the driving circuit according to the first embodiment described earlier, the first transistor $TR_1$ functioning as the first switch circuit $SW_1$ is controlled by a signal asserted on the scan line $SCL_m$. In the case of this second embodiment, on the other hand, the gate electrode of the first transistor $TR_1$ is connected to a first-transistor control line $CL1_m$. The first-transistor controlling circuit 121 supplies a signal to the gate electrode of the first transistor $TR_1$ by way of the first-transistor control line $CL1_m$ in order to put the first transistor $TR_1$ in a turned-on or turned-off state.

In the case of the first embodiment, each of the gate electrode of the third transistor $TR_3$ serving as the third switch circuit $SW_3$ and the gate electrode of the fourth transistor $TR_4$ serving as the fourth switch circuit $SW_4$ is connected to the control line $CL_m$ common to the third switch circuit $SW_3$ and the fourth switch circuit $SW_4$ so that the third switch circuit $SW_3$ and the fourth switch circuit $SW_4$ are control to enter a turned-on or turned-off state by the same control signal asserted on the control line $CL_m$. In the case of the second embodiment, on the other hand, the gate electrode of the third transistor $TR_3$ is connected to the third-transistor control line $CL3_m$ whereas the gate electrode of the fourth transistor $TR_4$ is connected to the fourth-transistor control line $CL4_m$.

In the case of the second embodiment, the third-transistor controlling circuit 123 supplies a signal to the gate electrode of the third transistor $TR_3$ by way of the third-transistor control line $CL3_m$ in order to control transitions of the third transistor $TR_3$ from a turned-on state to a turned-off state and vice versa. By the same token, the fourth-transistor controlling circuit 124 supplies a signal to the gate electrode of the fourth transistor $TR_4$ by way of the fourth-transistor control line $CL4_m$ in order to control transitions of the fourth transistor $TR_4$ from a turned-on state to a turned-off state and vice versa.

A commonly known configuration and a commonly known structure can be used respectively as the configuration and structure of each of the first-transistor controlling circuit 121, the third-transistor controlling circuit 123 and the fourth-transistor controlling circuit 124. By the same token, a commonly known configuration and a commonly known structure can be used respectively as the configuration and structure of each of the first-transistor control line CL1, the third-transistor control line CL3 and the fourth-transistor control line CL4.

In the same way as the description of the first embodiment, the following description explains driving operations carried out by the display apparatus on the light emitting unit 10 located at the intersection of the mth matrix row and the nth matrix column.

Figure 8:
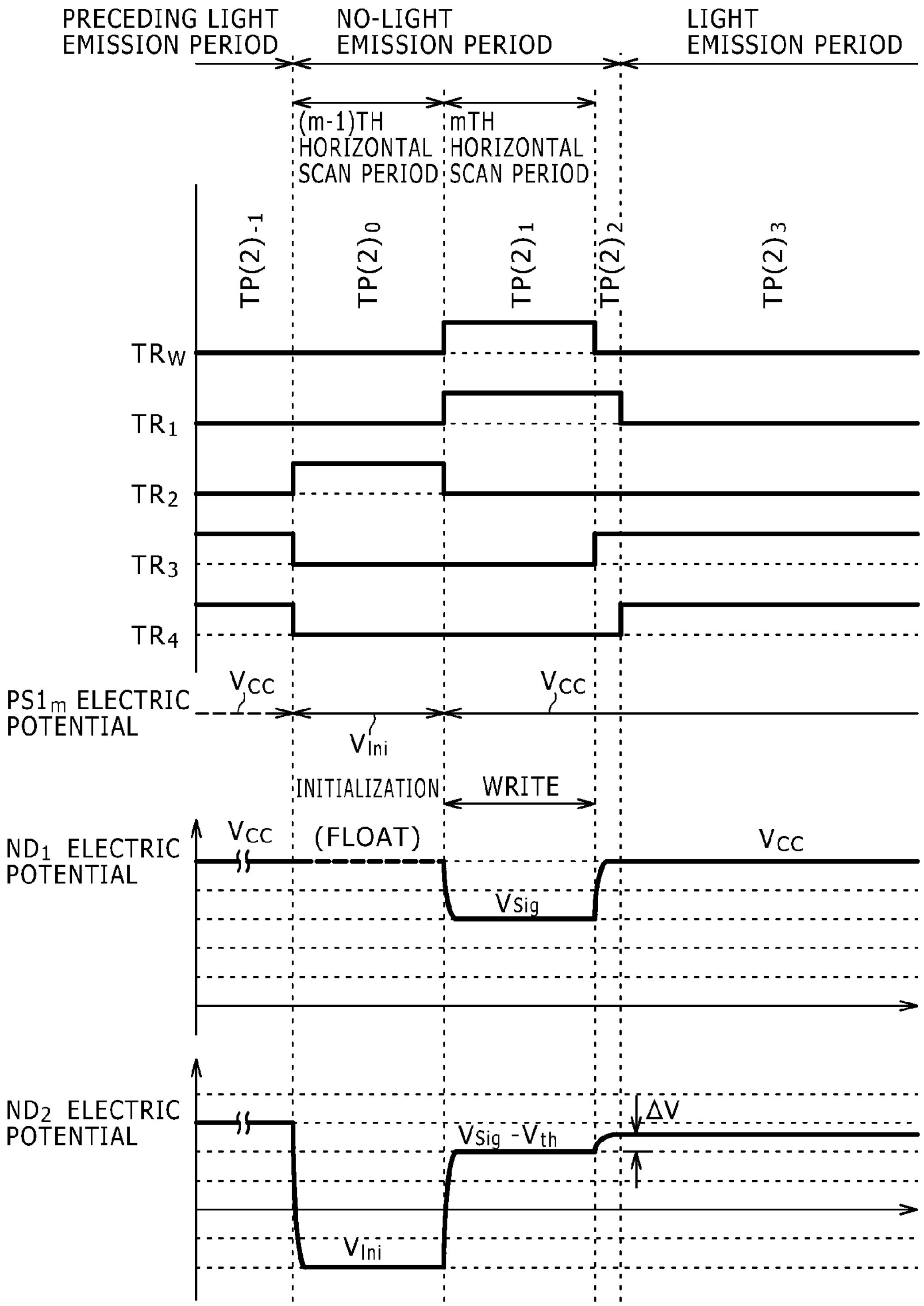
FIG. 8 is a timing diagram showing a model of timing charts of signals involved in driving operations carried out by the display apparatus according to the second embodiment.
Figure 9A:
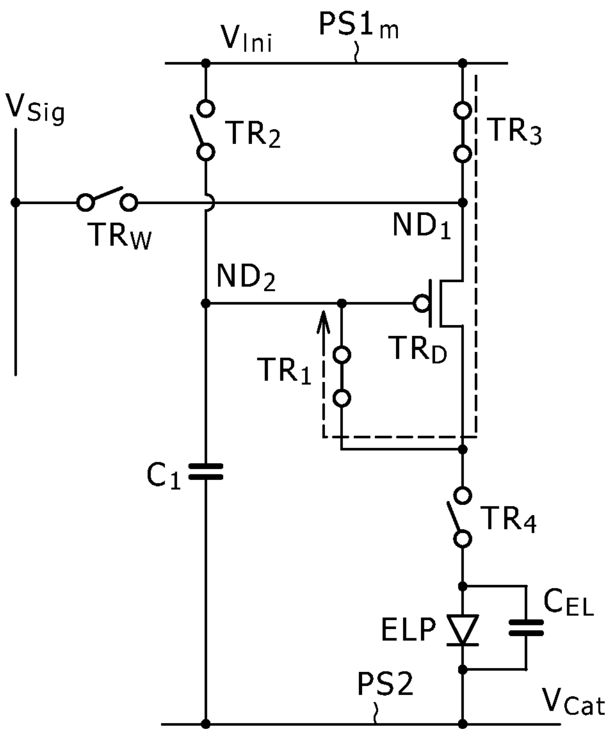
FIGS. 9A and 9B are model circuit diagrams showing turned-on and turned-off states of transistors in the driving circuit.
Figure 9B:
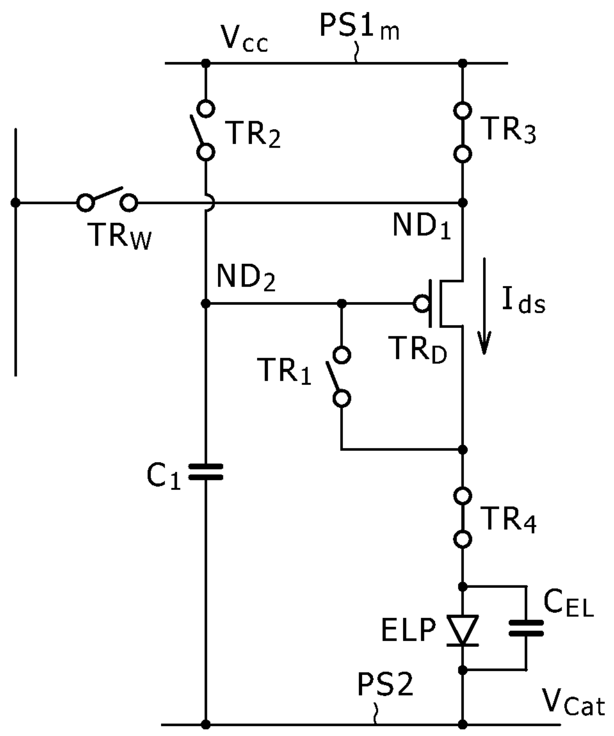

A model of timing charts of signals involved in the driving operations carried out by the display apparatus is shown in the timing diagram of FIG. 8. FIGS. 9A and 9B are a plurality of model circuit diagrams referred to in description of driving operations carried out by the display apparatus. To be more specific, FIGS. 9A and 9B are model circuit diagrams showing turned-on and turned-off states of transistors in the driving circuit 11.

In the second embodiment, between the signal writing process and the light emission process, a second-node electric-potential correction process is carried out so as to change an electric potential appearing on the second node $ND_2$ by applying a voltage with a magnitude determined in advance to the first node $ND_1$ for a period determined in advance with the first switch circuit $SW_1$ already put in a turned-on state in order to put the second node $ND_2$ in a state of being electrically connected to the other one of the source and drain areas of the device driving transistor $TR_D$. To put it more concretely, the signal writing process is carried out during a period $TP(\mathbf{2})_1$ shown in the timing diagram of FIG. 8, the second-node electric-potential correction process is executed during a period $TP(\mathbf{2})_2$ lagging behind the period $TP(\mathbf{2})_1$ as shown in the same timing diagram whereas the light emission process is performed during a period $TP(\mathbf{2})_3$ lagging behind the period $TP(\mathbf{2})_2$ as shown in the same timing diagram. The following description explains details of an operation carried out in every period shown in the timing diagram of FIG. 8.

Period $TP(\mathbf{2})_{-1}$ (With Reference to FIG. 8)

As is the case with the period $TP(\mathbf{1})_{-1}$ shown in the timing diagram of FIG. 4, the period $TP(\mathbf{2})_{-1}$ serving as the period of a light emission process is the period in which the light emitting unit 10 serving as the (n, m)th sub-pixel circuit is in an immediately preceding light emission state of emitting light at a luminance according to a video signal $V'_{Sig}$ written right before. Each of the third transistor $TR_3$ and the fourth transistor $TR_4$ is put in a turned-on state whereas each of the signal writing transistor $TR_W$, the first transistor $TR_1$ and the second transistor $TR_2$ is conversely put in a turned-off state. The turned-on and turned-off states of the transistors composing the driving circuit 11 are the same as those explained earlier by referring to the circuit diagram of FIG. 5A as the turned-on and turned-off states for the first embodiment. Through the light emitting device ELP employed in the light emitting unit 10 serving as the (n, m)th sub-pixel circuit, the source-to-drain current $I'_{ds}$ expressed by Eq. (7) to be described later is flowing. Thus, the light emitting device ELP employed in the light emitting unit 10 serving as the (n, m)th sub-pixel circuit is emitting light with a luminance determined by the source-to-drain current $I'_{ds}$.

Period $TP(\mathbf{2})_0$ (With Reference to FIG. 8)

Much like the period $TP(\mathbf{1})_0$ shown in the timing diagram of FIG. 4, the period $TP(\mathbf{2})_0$ is the (m−1)th horizontal scan period of the currently displayed frame. The turned-on and turned-off states of transistors employed in the driving circuit 11 are shown in the circuit diagram of FIG. 5B referred to earlier in the description of the first embodiment. However, the display apparatus according to the second embodiment is different from the display apparatus according to the first embodiment in that, in the case of the configuration of the display apparatus according to the second embodiment, the first transistor $TR_1$, the third transistor $TR_3$ and the fourth transistor $TR_4$ are controlled by a first-transistor controlling circuit 121, a third-transistor controlling circuit 123 and a fourth-transistor controlling circuit 124 respectively. Otherwise, operations carried out in the period $TP(\mathbf{2})_0$ are identical with the operations carried out in the period $TP(\mathbf{1})_0$ of the first embodiment. Thus, the operations carried out in the period $TP(\mathbf{2})_0$ are not explained. As explained earlier in the description of the first embodiment, the initialization voltage $V_{Ini}$ is used to set the electric potential appearing on the second node $ND_2$ at a predetermined reference electric potential of −4 volts.

Period $TP(\mathbf{2})_1$ (With Reference to FIG. 8)

Much like the period $(\mathbf{1})_1$ shown in the timing diagram of FIG. 4, the period $TP(\mathbf{2})_1$ serving as the period of the signal writing process is the mth horizontal scan period of the currently displayed frame. The turned-on and turned-off states of the transistors composing the driving circuit 11 are the same as those explained earlier by referring to the circuit diagram of FIG. 5C as the turned-on and turned-off states for the first embodiment.

Operations carried out in the period $TP(\mathbf{2})_1$ are basically identical with the operations carried out in the period $TP(\mathbf{1})_1$ of the first embodiment. In the case of the first embodiment, however, before the (m+1)th horizontal scan period is started, a signal asserted on the scan line $SCL_m$ puts the first transistor $TR_1$ in a turned-off state. The display apparatus according to the second embodiment is different from the display apparatus according to the first embodiment in that, in the case of the display apparatus according to the second embodiment, the first transistor $TR_1$ is sustained in a turned-on state till the end of a period $TP(\mathbf{2})_2$ which will be described later. As explained earlier in the description of the first embodiment, the electric potential $V_{ND2}$ appearing on the second node $ND_2$ is expressed by Eq. (2) given as follows.

$$V_{ND2} \approx (V_{Sig} - V_{th}) \tag{2}$$

Period $TP(\mathbf{2})_2$ (With Reference to FIGS. 8 and 9A)

The period $TP(\mathbf{2})_2$ is the period of the second-node electric-potential correction process of changing an electric potential appearing on the second node $ND_2$ by applying a voltage having a magnitude determined in advance to the first node $ND_1$ for a time period determined in advance with the first switch circuit $SW_1$ already put in a turned-on state in order to put the second node $ND_2$ in a state of being electrically connected to the other one of the source and drain areas of the device driving transistor $TR_D$. In the case of the second embodiment, the second-node electric-potential correction process is carried out by applying the driving voltage $V_{CC}$ to the first node $ND_1$ as the voltage having a magnitude determined in advance.

To put it concretely, the first transistor $TR_1$ is sustained in a turned-on state whereas the third transistor $TR_2$ is put in a turned-on state in order to apply the driving voltage $V_{CC}$ to the first node $ND_1$ as the voltage having a magnitude determined in advance for the period $TP(\mathbf{2})_2$. It is to be noted that each of the second transistor $TR_2$ and the fourth transistor $TR_4$ is sustained in a turned-off state. As a result, if the mobility μ of the device driving transistor $TR_D$ is large, the source-to-drain current flowing through the device driving transistor $TR_D$ is also large, resulting in a large electric-potential change ΔV or a large electric-potential correction value ΔV. If the mobility μ of the device driving transistor $TR_D$ is small, on the other hand, the source-to-drain current flowing through the device driving transistor $TR_D$ is also small, resulting in a small electric-potential change ΔV or a small electric-potential correction value ΔV. Since the second node $ND_2$ is electrically connected to the drain area of the device driving transistor $TR_D$, the electric potential $V_{ND2}$ appearing on the second node $ND_2$ also rises by the electric-potential change ΔV or the electric-potential correction value ΔV. The equation for expressing the electric potential $V_{ND2}$ appearing on the second node $ND_2$ is changed from Eq. (2) to Eq. (5) given as follows.

$$V_{ND2} \approx (V_{Sig} - V_{th}) + \Delta V \quad (5)$$

It is to be noted that the entire length $t_0$ of the period $TP(\mathbf{2})_2$ during which the second-node electric-potential correction process is carried out is determined in advance as a design value at the stage of designing the display apparatus. In addition, by carrying out the second-node electric-potential correction process, the source-to-drain current $I_{ds}$ is also compensated at the same time for variations in coefficient k which is expressed as follows: $k \equiv (1/2)*(W/L)*C_{OX}$.

Period $TP_2(\mathbf{3})$ (With Reference to FIGS. 8 and 9B)

The period $TP(\mathbf{2})_3$ is the period of the next light emission process of driving the light emitting device ELP to emit light.

To put it more concretely, at the beginning of the period $TP(\mathbf{2})_3$, the first transistor $TR_1$ is put in a turned-off state whereas the fourth transistor $TR_4$ is put in a turned-on state. The second transistor $TR_2$ is sustained in a turned-off state whereas the third transistor $TR_3$ is sustained in a turned-on state. The driving voltage $V_{CC}$ determined in advance is applied to the first node $ND_1$ by way of the third switch circuit $SW_3$ sustained in the turned-on state whereas the fourth switch circuit $SW_4$ put in a turned-on state puts the other one of the source and drain areas of the device driving transistor $TR_D$ in a state of being electrically connected to a specific one of the electrodes of the light emitting device ELP. In these states, a driving current generated by the device driving transistor $TR_D$ is flowing to the light emitting device ELP and driving the light emitting device ELP to emit light.

Following Eq. (6) is derived from Eq. (5).

$$V_{gs} \approx V_{CC} - ((V_{Sig} - V_{th}) + \Delta V) \quad (6)$$

Thus, Eq. (1) can be changed to following Eq. (7).

$$\begin{aligned} I_{ds} &= k*\mu*(V_{gs} - V_{th})^2 \quad (7) \\ &= k*\mu*((V_{CC} - V_{Sig}) - \Delta V)^2 \end{aligned}$$

As is obvious from Eq. (7) given above, the source-to-drain current $I_{ds}$ flowing to the light emitting device ELP is proportional to the square of a difference between an electric-potential difference ($V_{CC}-V_{Sig}$) and the electric-potential correction value $\Delta V$ which is determined by the mobility $\mu$ of the device driving transistor $TR_D$. In other words, the source-to-drain current $I_{ds}$ flowing to the light emitting device ELP is not dependent on the threshold voltage $V_{th}$ of the device driving transistor $TR_D$. That is to say, the luminance (or the light quantity) of light emitted by the light emitting device ELP is not affected by the threshold voltage $V_{th}$ of the device driving transistor $TR_D$. The luminance of light emitted by the light emitting device ELP employed in the (n, m) light emitting unit 10 is a value determined by the source-to-drain current $I_{ds}$ flowing to the light emitting device ELP.

In addition, the larger the mobility $\mu$ of the device driving transistor $TR_D$, the larger the electric-potential correction value $\Delta V$. Thus, the larger the mobility $\mu$ of the device driving transistor $TR_D$, the smaller the value of the expression $((V_{CC}-V_{Sig})-\Delta V)^2$ included in Eq. (7) or the smaller the magnitude of the source-to-drain current $I_{ds}$. As a result, the source-to-drain current $I_{ds}$ can be compensated for variations in mobility $\mu$ from transistor to transistor. That is to say, if a video signal $V_{Sig}$ having the same value is applied to different light emitting units 10 employing device driving transistors $TR_D$ having different values of the mobility p, the source-to-drain currents $I_{ds}$ generated by the device driving transistors $TR_D$ have magnitudes about equal to each other. As a result, the source-to-drain current $I_{ds}$ flowing to the light emitting device ELP as a driving current for controlling the luminance of light emitted by the light emitting device ELP can be made uniform. Thus, it is possible to eliminate the effects of variations in mobility $\mu$ or the effects of variations in coefficient k, and it is therefore possible to eliminate the effects of variations of the luminance of light emitted by the light emitting device ELP.

The light emission state of the light emitting device ELP is sustained till the (m−1)th horizontal scan period of the immediately following frame. That is to say, the light emission state of the light emitting device ELP is sustained till the end of the period $TP(\mathbf{2})_{-1}$ of the immediately following frame.

At the end of the light emission state of the light emitting device ELP, the series of processes of driving the light emitting unit 10 serving as the (n, m)th sub-pixel circuit as described above is completed.

The present invention has been exemplified above by taking preferred embodiments as typical examples. However, implementations of the present invention are by no means limited to this preferred embodiment. That is to say, the configuration and structure of each component employed in the driving circuit 11 and the light emitting device ELP which are included in the light emitting unit 10 of the display apparatus according to the preferred embodiment as well as the processes of the method for driving the light emitting device ELP are typical examples and can thus be changed properly.

In the period $TP(\mathbf{2})_0$ of the second embodiment for example, both the third switch circuit $SW_3$ and the fourth switch circuit $SW_4$ are put in a turned-off state. However, it is also possible to provide a configuration in which only either one of the third switch circuit $SW_3$ and the fourth switch circuit $SW_4$ is put in a turned-off state.

It is also possible to provide a configuration in which, during the second-node electric-potential initialization process of setting the electric potential appearing on the second node $ND_2$ at the initialization voltage $V_{Ini}$, the initialization voltage $V_{Ini}$ is applied to the first node $ND_1$ and, even if the device driving transistor $TR_D$ is put in a state of being electrically connected to the light emitting device ELP, there is no problem such as existence of abnormal emission of light in the light emitting device ELP, or even if such abnormal emission of light exists, the abnormal light emission can be ignored in some cases. In such cases, during the period $TP(\mathbf{1})_0$ of the first embodiment and the period $TP(\mathbf{2})_0$ of the second embodiment, each of the third switch circuit $SW_3$ and the fourth switch circuit $SW_4$ can be put in a turned-on state.

The present application contains subject matter related to that disclosed in Japanese Priority Patent Application JP 2008-119840 filed in the Japan Patent Office on May 1, 2008, the entire content of which is hereby incorporated by reference.

In addition, it should be understood by those skilled in the art that a variety of modifications, combinations, sub-combinations and alterations may occur, depending on design requirements and other factors as far as they are within the scope of the appended claims or the equivalents thereof.

What is claimed is:

1. A display apparatus comprising:

a plurality of light emitting units;

a plurality of scan lines;

a plurality of data lines;

a driving circuit provided for each of said light emitting units including a first transistor, a second transistor, a capacitor, a first switch circuit and a second switch circuit; and a first power-supply line, which supplies either a first voltage or a second voltage, and a second power-supply line, which supplies a third voltage, wherein in each of said light emitting units:

a light emitting device of the light emitting unit is connected to the second power-supply line, a first current terminal of said first transistor is connected to one of said data lines, a gate electrode of said first transistor is connected to one of said scan lines, a first current terminal of said second transistor is connected to a second current terminal of said first transistor through a first node, a first terminal of said capacitor is connected to said second power-supply line, a second terminal of said capacitor is connected to a gate electrode of said second transistor through a second node, a first terminal of said first switch circuit is connected to said second node, a second terminal of said first switch circuit is connected to a second current terminal of said second transistor, and said second switch circuit is connected between said second node and said first power-supply line.

2. The display apparatus according to claim 1, wherein said light emitting device is an organic electro luminescence light emitting device.

3. The display apparatus according to claim 1, wherein the driving circuit is configured to:

perform a second-node electric-potential initialization process by applying said initialization voltage to said second node by way of said second switch circuit put in a turned-on state and, then, putting said second switch circuit in a turned-off state in order to set an electric potential appearing on said second node at a reference electric potential determined in advance; and perform a light emission process by sustaining said second switch circuit in a turned-off state and applying said driving voltage appearing on said first power-supply line to said first node in order to allow a driving current to flow from said device driving transistor to said light emitting device so as to drive said light emitting device to emit light.

4. The display apparatus according to claim 1, wherein the driving circuit includes:

a third switch circuit connected between said first node and said first power-supply line; and a fourth switch circuit connected between said second source and drain area of said device driving transistor and a first electrode of said light emitting unit.

5. The display apparatus according to claim 4, wherein the driving circuit is configured to:

perform a second-node electric-potential initialization process by applying said initialization voltage to said second node by way of said second switch circuit put in a turned-on state and, then, putting said second switch circuit in a turned-off state in order to set an electric potential appearing on said second node at a reference electric potential determined in advance;

perform a signal writing process by sustaining each of said second, third and fourth switch circuits in a turned-off state and putting said first switch circuit in a turned-on state to put said second node in a state of being electrically connected to said second source and drain area of said device driving transistor so as to apply a video signal appearing on one of said data lines to said first node by way of said signal writing transistor put in a turned-on state by a signal appearing on one of said scan lines in order to change an electric potential appearing on said second node toward an electric potential obtained as a result of subtracting said threshold voltage of said device driving transistor from said video signal;

apply a signal asserted on one of said scan lines to said gate electrode of said signal writing transistor after performing said signal writing process in order put said signal writing transistor in a turned-off state; and perform a light emission process of putting said first switch circuit in a turned-off state, sustaining said second switch circuit in a turned-off state, putting said second source and drain area of said device driving transistor in a state of being electrically connected to said first electrode of said light emitting device by way of said fourth switch circuit put in a turned-on state and applying said driving voltage to said first node by way of said third switch circuit which has already been put in a turned-on state so as to allow a driving current to flow from said device driving transistor to said light emitting device in order to drive said light emitting device.

6. A display apparatus comprising:

a plurality of pixel circuits having a light emitting device, a first transistor, a second transistor, a first switch circuit, a second switch circuit, and a capacitor, wherein a initialization voltage is supplied from a first voltage line to a gate of said second transistor via said second switch circuit during a first period, wherein a data voltage is supplied from a signal line to a gate of said second transistor via said first transistor, said second transistor, and said first switch circuit during a second period after the first period, wherein a driving current is supplied to said light emitting device according to said data voltage during a third period after the second period, wherein said light emitting device has an anode electrode, a light emitting layer, and a cathode electrode, and is provided on a first insulation layer covering said plurality of pixel circuits, and wherein said cathode electrode is provided on a second insulation layer which is arranged on said first insulation layer, and is connected to a second power-supply line via a first contact formed in said first insulation layer and a second contact formed in the second insulation layer.

7. The display apparatus according to claim 6, wherein the plurality of pixel circuits include a red-light emitting pixel, a green-light emitting pixel, a blue-light emitting pixel, and white-light emitting pixel.

8. The display apparatus according to claim 6, wherein the plurality of pixel circuits include a red-light emitting pixel, a green-light emitting pixel, a blue-light emitting pixel, and yellow-light emitting pixel.

* * * * *